US012402561B2

(12) United States Patent
Modak et al.

(10) Patent No.: US 12,402,561 B2
(45) Date of Patent: Sep. 2, 2025

(54) AUTOMATED LOCKOUT SYSTEM FOR HEADER

(71) Applicant: DEERE & COMPANY, Moline, IL (US)

(72) Inventors: Shreyas P. Modak, Thane (IN); Alex A. Brimeyer, Bettendorf, IA (US); Michael L. Vandeven, Leclaire, IA (US)

(73) Assignee: Deere & Company, Moline, IL (US)

( * ) Notice: Subject to any disclaimer, the term of this patent is extended or adjusted under 35 U.S.C. 154(b) by 689 days.

(21) Appl. No.: 17/443,076

(22) Filed: Jul. 20, 2021

(65) Prior Publication Data

US 2023/0023341 A1     Jan. 26, 2023

(51) Int. Cl.
| A01D 41/14 | (2006.01) |
| A01B 63/16 | (2006.01) |
| A01D 34/04 | (2006.01) |
| A01D 34/24 | (2006.01) |
| A01D 34/28 | (2006.01) |

(52) U.S. Cl.
CPC ............. *A01D 41/14* (2013.01); *A01D 34/04* (2013.01); *A01D 34/243* (2013.01); *A01D 34/28* (2013.01); *A01D 41/145* (2013.01); *A01B 63/16* (2013.01)

(58) Field of Classification Search
CPC ...... A01D 41/14; A01D 34/28; A01D 34/283; A01D 34/243; A01D 41/145; A01D 75/287; A01B 63/16
See application file for complete search history.

(56) References Cited

U.S. PATENT DOCUMENTS

| 1,451,140 A | 4/1923 | Brown |
| 2,513,703 A | 7/1950 | Annis |
| 2,863,273 A | 12/1958 | Turner |
| 2,915,870 A | 12/1959 | Hume |
| 3,349,549 A | 10/1967 | Der Lely |
| 3,517,491 A | 6/1970 | Lausch et al. |
| 3,577,713 A | 5/1971 | McCarty et al. |
| 3,599,405 A | 8/1971 | Hurlburt et al. |

(Continued)

FOREIGN PATENT DOCUMENTS

| CA | 3026913 A1 | 10/2019 |
| EP | 1993345 B1 | 1/2018 |

(Continued)

OTHER PUBLICATIONS

Modak et al., Automated Lockout System for Header, U.S. Appl. No. 17/443,064, filed Jul. 20, 2021, 51 pages (specification and drawings).

(Continued)

*Primary Examiner* — Joseph M Rocca
*Assistant Examiner* — Julia C Tran
(74) *Attorney, Agent, or Firm* — Lucian Wayne Beavers; Patterson Intellectual Property Law PC

(57) ABSTRACT

Systems and methods for automatically configuring a cutterbar between a flexible configuration and a rigid configuration in response to actuation of a gauge wheel are disclosed. The cutterbar is coupled to the gauge wheel such that extension of the gauge wheel causes the cutterbar to move into the rigid configuration and retraction of the gauge wheel causes the cutterbar to move into the flexible configuration.

20 Claims, 16 Drawing Sheets

(56) References Cited

U.S. PATENT DOCUMENTS

| | | | |
|---|---|---|---|
| 3,698,164 | A | 10/1972 | Boone et al. |
| 3,747,311 | A | 7/1973 | De Coene et al. |
| 3,797,207 | A | 3/1974 | Sawyer et al. |
| 3,808,784 | A | 5/1974 | Krukow et al. |
| 3,828,532 | A | 8/1974 | Fickle et al. |
| 3,919,831 | A | 11/1975 | Halls et al. |
| 4,124,970 | A | 11/1978 | Bernhardt |
| 4,127,981 | A | 12/1978 | Parrish et al. |
| 4,204,383 | A | 5/1980 | Milliken, Jr. |
| 4,332,126 | A | 6/1982 | Van Auwelaer et al. |
| 4,573,308 | A | 3/1986 | Ehrecke et al. |
| 4,599,852 | A | 7/1986 | Kerber et al. |
| 4,843,804 | A | 7/1989 | Wellman |
| 6,675,568 | B2 | 1/2004 | Patterson et al. |
| 7,520,115 | B2 | 4/2009 | Coers et al. |
| 7,549,243 | B1* | 6/2009 | Gilles ............... E02F 3/627 403/321 |
| 7,640,720 | B1 | 1/2010 | Lovett et al. |
| 7,661,251 | B1 | 2/2010 | Sloan et al. |
| 7,805,921 | B2 | 10/2010 | Coers et al. |
| 7,877,976 | B2 | 2/2011 | Honas et al. |
| 7,930,871 | B1 | 4/2011 | Figgins |
| 7,937,919 | B2 | 5/2011 | Coers et al. |
| 7,992,374 | B1 | 8/2011 | Bich et al. |
| 8,245,489 | B2 | 8/2012 | Talbot |
| 8,393,135 | B2 | 3/2013 | Honas et al. |
| 8,534,037 | B2 | 9/2013 | Sauerwein et al. |
| 8,601,779 | B1 | 12/2013 | Figgins et al. |
| 9,148,999 | B2 | 10/2015 | Fuechtling |
| 9,750,185 | B2* | 9/2017 | Fay ............... A01D 47/00 |
| 9,775,291 | B2* | 10/2017 | Neudorf ............... A01D 41/145 |
| 10,433,486 | B2 | 10/2019 | Vandeven et al. |
| 10,462,968 | B2 | 11/2019 | Shearer |
| 10,517,215 | B2 | 12/2019 | Brimeyer et al. |
| 10,542,669 | B2 | 1/2020 | Vandeven et al. |
| 11,246,259 | B2 | 2/2022 | Yanke et al. |
| 11,382,262 | B2* | 7/2022 | Thomas ............... A01D 34/283 |
| 11,559,000 | B2 | 1/2023 | Brimeyer |
| 11,778,943 | B2 | 10/2023 | Brimeyer |
| 2003/0010010 | A1 | 1/2003 | Buermann |
| 2003/0074876 | A1 | 4/2003 | Patterson et al. |
| 2006/0242935 | A1 | 11/2006 | Rayfield et al. |
| 2007/0193243 | A1 | 8/2007 | Schmidt et al. |
| 2007/0204585 | A1 | 9/2007 | Lovett et al. |
| 2008/0271426 | A1 | 11/2008 | Lohrentz et al. |
| 2009/0249760 | A1 | 10/2009 | Sauerwein et al. |
| 2009/0277147 | A1 | 11/2009 | Honas et al. |
| 2009/0293441 | A1 | 12/2009 | Sauerwein |
| 2010/0000191 | A1* | 1/2010 | Ehrhart ............... A01D 34/283 56/10.2 E |
| 2010/0043368 | A1 | 2/2010 | Sloan et al. |
| 2010/0083629 | A1 | 4/2010 | Klotzbach et al. |
| 2010/0281837 | A1 | 11/2010 | Talbot |
| 2011/0252761 | A1 | 10/2011 | Bich et al. |
| 2014/0041351 | A1 | 2/2014 | Bollin et al. |
| 2014/0075912 | A1* | 3/2014 | Fuechtling ............... A01D 41/14 56/181 |
| 2014/0076153 | A1 | 3/2014 | Brockmann |
| 2014/0090345 | A1 | 4/2014 | Honas et al. |
| 2014/0318098 | A1* | 10/2014 | Fay, II ............... A01D 34/001 56/229 |
| 2015/0007545 | A1 | 1/2015 | Honas et al. |
| 2015/0271999 | A1 | 10/2015 | Enns et al. |
| 2015/0319920 | A1* | 11/2015 | Joyce ............... A01D 34/283 81/177.1 |
| 2019/0029174 | A1 | 1/2019 | Talbot et al. |
| 2019/0029175 | A1 | 1/2019 | Talbot et al. |
| 2019/0029176 | A1 | 1/2019 | Yanke et al. |
| 2019/0183049 | A1* | 6/2019 | Cook ............... A01D 43/107 |
| 2019/0200523 | A1* | 7/2019 | Fay, II ............... A01D 41/145 |
| 2019/0230858 | A1* | 8/2019 | Shearer ............... A01D 41/141 |
| 2019/0297775 | A1 | 10/2019 | Fuechtling et al. |
| 2020/0053963 | A1 | 2/2020 | Vandeven et al. |
| 2020/0337227 | A1 | 10/2020 | Yanke et al. |
| 2020/0337239 | A1 | 10/2020 | Brimeyer et al. |
| 2020/0344950 | A1 | 11/2020 | Brimeyer et al. |
| 2021/0185875 | A1 | 6/2021 | Noll et al. |
| 2021/0185878 | A1 | 6/2021 | Hunt |
| 2021/0185908 | A1 | 6/2021 | Hunt |
| 2021/0185915 | A1 | 6/2021 | Hunt |
| 2021/0212248 | A1 | 7/2021 | Kong et al. |
| 2021/0212254 | A1 | 7/2021 | Thomas et al. |
| 2021/0274706 | A1* | 9/2021 | Cook ............... A01D 34/14 |
| 2021/0307233 | A1* | 10/2021 | Lyons ............... A01D 75/002 |
| 2021/0368675 | A1 | 12/2021 | Brimeyer |
| 2021/0392816 | A1* | 12/2021 | Cook ............... A01D 41/16 |
| 2022/0007578 | A1* | 1/2022 | Trowbridge ............... A01D 41/145 |
| 2022/0030767 | A1 | 2/2022 | Cook |
| 2022/0338416 | A1 | 10/2022 | Racchella et al. |
| 2023/0022413 | A1 | 1/2023 | Modak et al. |
| 2023/0023341 | A1 | 1/2023 | Modak et al. |
| 2023/0024403 | A1 | 1/2023 | Modak et al. |
| 2023/0076926 | A1 | 3/2023 | Füchtling et al. |
| 2023/0076930 | A1 | 3/2023 | Modak et al. |
| 2023/0284561 | A1 | 9/2023 | Trowbridge |
| 2023/0380347 | A1 | 11/2023 | Trowbridge |
| 2023/0413709 | A1 | 12/2023 | Honey et al. |
| 2024/0114826 | A1 | 4/2024 | Modak et al. |

FOREIGN PATENT DOCUMENTS

| | | |
|---|---|---|
| EP | 3498071 A1 | 6/2019 |
| EP | 3942918 A1 | 1/2022 |
| RU | 2480979 C2 | 5/2013 |
| WO | WO 2020101855 A1 | 5/2020 |
| WO | WO 2020101859 A1 | 5/2020 |

OTHER PUBLICATIONS

Modak et al., Automated Lockout System for Header, U.S. Appl. No. 17/443,079, filed Jul. 20, 2021, 51 pages (specification and drawings).

3152 3162 Case IH TerraFlex Draper Header Set Up & Operation [online], Jan. 10, 2014 [retrieved on Oct. 18, 2024]. Retrieved from YouTube <URL: https://www.youtube.com/watch?v=Ws7RQGnvWtA>.

Claas Convio Flexible Draper [online], Jun. 18, 2021 [retrieved on Oct. 18, 2024]. Retrieved from YouTube <URL: https://www.youtube.com/watch?v=kA01ZGbZIXI>.

Deere 700FD Flexible Draper Active Header Height Control (AHHC) Quick Reference Guide, 2020, pp. 1-6 (6 pages).

Geringhoff TruFlex Razor Draper Head Operating Manual, 2017, pp. 1, 159-170, and 241 (14 pages).

Honey Bee Manufacturing 2020 Grain/Rice Belt Header Operator Manual, 2020, pp. 1-5, 57-63 (12 pages).

MacDon FD1 Series FlexDraper Header for Combines with FM100 Float Module Parts Catalog, 2019, pp. i-xvi, pp. 1-366, (410 pages).

MacDon FD2 Series FlexDraper Header with FM200 Float Module Operator's Manual, 2022, pp. 1, 2, 52-60, and 98-104. (18 pages).

Case IH 3162—Draper Header (Nov. 2011-) Parts (messicks.com), pp. 1-5, [online], [retrieved on Apr. 6, 2020]. Retrieved from the Internet <URL: https://www.messicks.com/commoncatalog?vendor=cas&modelId=142078&sectionId=300671&diagramId=1336949>.

Case-IH-3152-3162-Draper-Header-Productivity-Guide-GH-2073-20, copyright 2020, pp. 1-24.

Geringhoff, TruFlex (Razor) Draper Head, pp. 1-16.

Geringhoff, TrueFlex Razor Draper Head, Operating Manual, pp. 1-241 (revelant pages are pp. 159-161).

John Deere, 600FD-Flexible Draper Active Header Height Control, Quick Reference Guide, pp. 1-6.

* cited by examiner

AUTOMATED LOCKOUT SYSTEM FOR HEADER

FIELD OF THE DISCLOSURE

The present disclosure relates generally to an agricultural header and, particularly, to selectively configuring a cutterbar of an agricultural header.

BACKGROUND OF THE DISCLOSURE

Agricultural harvesters use a variety of implements to gather crops. A "draper" or "draper header" is one such type of these implements. Conventional draper headers use conveyors with endless belts to carry cut crop material from leading-edge knives to center regions of the headers. From there, the cut crop material is conveyed into the harvesters. Once in the harvester, the cut crop material is further processed by separating grain from unwanted crop material (typically called "material other than grain" or "MOG").

SUMMARY OF THE DISCLOSURE

A first aspect of the present disclosure is directed to a system for automatically configuring a cutterbar of an agricultural implement. The system may include a cutterbar, a float arm engaged with the cutterbar, and an actuation system that connects the float arm and a gauge wheel, the float arm movable, via the actuation system, in response to one of retraction and extension of the gauge wheel to move the cutterbar between a rigid configuration and a flexible configuration. A second aspect of the present disclosure is directed to a frame, a gauge wheel assembly coupled to the frame and moveable between an extended position and a retracted position, a float arm pivotably coupled to the frame, a cutterbar engaged with the float arm, the cutterbar moveable between a rigid configuration and a flexible configuration in response to rotation of the float arm, and a cutterbar engaged with the float arm, the cutterbar moveable between a rigid configuration and a flexible configuration in response to rotation of the float arm. The float arm may be rotatable, via the actuation system, in response to movement of the gauge wheel assembly. The float arm may be pivotable in a first direction in response to extension of the gauge wheel assembly to place the cutterbar in the rigid configuration, and the float arm may be pivotable in a second direction in response to retraction of the gauge wheel assembly to place the cutterbar in the flexible configuration.

The various aspects may include one or more of the following features. A gauge wheel assembly may be included, and the gauge wheel assembly may include an arm moveable between a retracted position and an extended position and a gauge wheel rotatably coupled to the arm. The gauge wheel arm may be pivotable about a pivot. Rotation of the gauge wheel arm about the pivot in a first direction may pivot the float arm in a second direction to place the cutterbar into the rigid configuration. Rotation of the gauge wheel arm about the pivot in a third direction, opposite the first direction, may pivot the float arm in a fourth direction, opposite the second direction, to place the cutterbar into the flexible configuration. The actuation system may include a lever coupled to the arm of the gauge wheel assembly and rotatable in response to movement of the arm, a pivotably mounted rocker arm comprising a first pin, and a pivotably mounted retainer. The retainer may include a first recess that removably receives the first pin. Rotation of the rocker arm in a first direction about a first axis may cause the first pin to engage the first recess and move the retainer into a locked configuration to secure the pin within the first recess. Rotation of the rocker arm in a second direction may cause the retainer to move into an unlocked configuration and removal of the first pin from the first recess. The retainer may be biased towards the locked configuration. The lever may include a second recess, and the rocker arm may further include a second pin. Extension of the arm from the retracted position to the extended position may rotate the lever to displace the rocker arm about the first axis to move the float arm into a first position in which the cutterbar is placed into the rigid configuration. Rotation of the lever in response to extension of the arm may cause the first pin to be received into the second recess and the second pin to be removed from the second recess. Receipt of the first pin into the first recess may engage the retainer that moves the retainer into a locked configuration to secure the first pin in the first recess. Retraction of the arm from the extended position to the retracted position may rotate the lever to capture the second pin into the second recess, causing the rocker arm to rotate about the first axis to move the float arm into a second position in which the cutterbar is placed into the flexible configuration and remove the first pin from the first recess. The lever may include a finger extending along a side of the second recess. The finger may engage the second pin to direct the second pin into the second recess during rotation of the lever as the arm is retracted from the extended position to the retracted position. The receipt of the first pin from the first recess or removal of the first pin from the first recess may pivot the retainer to compress a spring. Extension of the gauge wheel may include rotation of the gauge wheel in the first direction, and retraction of the gauge wheel may include rotation of the gauge wheel in the second direction.

Additionally, the various aspects may include one or more of the following features. The gauge wheel assembly may include an arm pivotably coupled to the frame and a gauge wheel rotatably mounted to the arm. The actuation system may include a lever coupled to the arm of the gauge wheel assembly and rotatable therewith, a pivotably mounted rocker arm that may include a first pin, and a pivotably mounted retainer. The retainer may include a first recess that removably receives the first pin, and the rocker arm may be coupled to the float arm. Rotation of the rocker arm in a first direction about an axis may cause the first pin to engage the first recess and move the retainer into a locked configuration to secure the pin within the first recess, and rotation of the rocker arm in a second direction ma cause the retainer to move into an unlocked configuration and removal of the first pin from the first recess. Extension of the arm from the retracted position to the extended position may rotate the lever to displace the rocker arm about an axis to move the float arm into a first position in which the cutterbar is placed into the rigid configuration. The lever may include a second recess, and the rocker arm may include a second pin. Rotation of the lever in response to extension of the arm may cause the first pin to be received into the first recess and the second pin to be removed from the second recess. The lever may include a second recess. The rocker arm may include a second pin, and retraction of the arm from the extended position to the retracted position may rotate the lever to capture the second pin into the second recess, causing the rocker arm to rotate about an axis to move the float arm into a second position in which the cutterbar is placed into the flexible configuration and to remove the first pin from the first recess.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
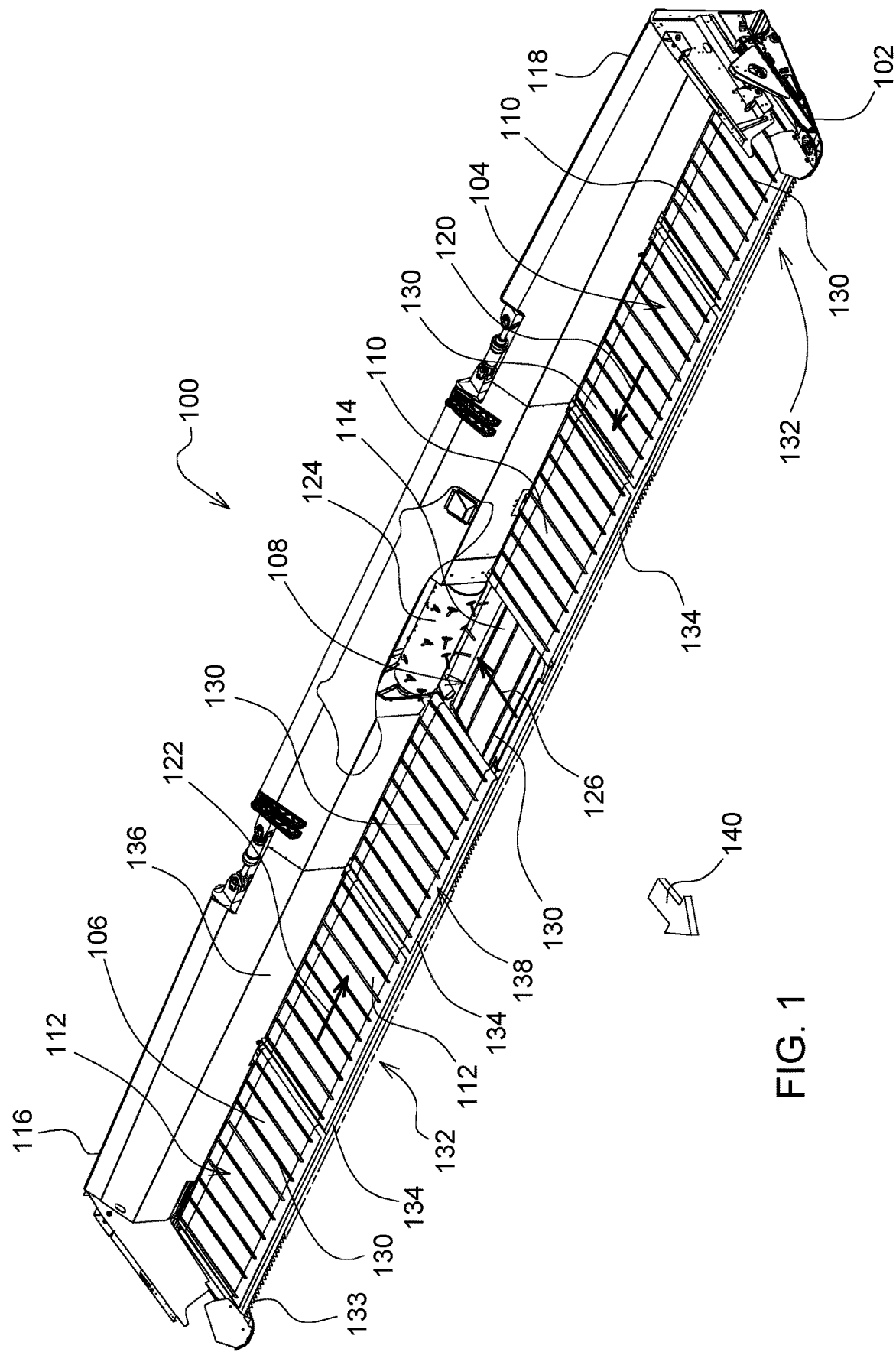
FIG. 1 is an oblique view of an example draper header, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to agricultural implements and, particularly, to draper headers that include automated lockout systems that are movable between a flexible configuration and a rigid configuration. Although various examples are provided in the context of draper headers, the scope of the present disclosure is applicable to other types of agricultural implements. In some implementations, the lockout systems are actuated in response to deployment of gauge wheels of the header. In the flexible configuration, float arms of the header are freely pivotable about respective axes, and, in the rigid configuration, the float arms are retracted into contact with a portion of the header, thereby providing a cutterbar attached to the float arms in a rigid configuration. Extension of the gauge wheels causes float arms and cutterbar to move into the rigid configuration. Retraction of the gauge wheels causes the float arms and cutterbar to move into the flexible configuration. In some instances, the lockout systems provide for abutting contact between the float arms and another portion of the frame without any adjustment provided either during manufacturing or in the field, thereby reducing manufacturing and maintenance time and complexity. Further, in some implementations, in the rigid configuration, torque applied to a lockout tube is reduced to zero or approximately zero, thereby reducing size, weight, and cost of the header. Additionally, lockout systems described herein are actuatable from a cab of a vehicle. Consequently, an operator avoids having to exit the cab of a vehicle in order to actuate a lockout system within the scope of the present disclosure.

Words of orientation, such as "up," "down," "top," "bottom," "above," "below," "leading," "trailing," "front," "back," "forward," and "rearward" are used in the context of the illustrated examples as would be understood by one skilled in the art and are not intended to be limiting to the disclosure. For example, for a particular type of vehicle in a conventional configuration and orientation, one skilled in the art would understand these terms as the terms apply to the particular vehicle.

For example, as used herein, with respect to an endless belt, unless otherwise defined or limited, the term "forward" (and the like) corresponds to a forward direction of travel of the belt, with respect to a supporting frame (e.g., a frame of a draper header), during normal operation of the belt. Likewise, the term "rearward" (and the like) corresponds to a direction opposite the forward direction of travel of the belt. In this regard, for example, a "forward facing" feature on an endless belt may generally face in the direction that the belt travels during normal operation, while a "rearward facing" feature may generally face opposite that direction.

Also as used herein, with respect to a header (or components thereof), unless otherwise defined or limited, the term "leading" (and the like) indicates a direction of travel of the header during normal operation (e.g., the forward direction of travel of a harvester vehicle carrying a header). Similarly, the term "trailing" (and the like) indicates a direction that is opposite the leading direction. In this regard, for example, a "leading" edge of a cutterbar of a draper header may be generally disposed at the front of the cutterbar, with respect to the direction travel of the draper header during normal operation (e.g., as carried by a harvester vehicle). Likewise, a "trailing" edge of the cutterbar may be generally disposed at the back or a side of the cutterbar opposite the leading edge, with respect to the direction of travel of the draper header during normal operation.

FIG. 1 shows an example draper header 100 that includes a frame 102 that supports a first side conveyor 104, a second side conveyor and 106, and a center conveyor 108. Each of the conveyors 104, 106, and 108 is configured as a belt-type conveyor extending over a respective circumferential length. The conveyors 104, 106, and 108 include endless belts 110, 112, and 114 that are moved in respective loops along the header 100 by motive devices, such as motors, gears, or internal belts. The conveyors 104 and 106 are disposed on opposing wings 116 and 118, respectively, of the header 100. In the illustrated example, the conveyor 104 includes two endless belts 110, and the conveyor 106 and two endless belts 112. In other implementations, the conveyors 104 and 106 may include additional or fewer endless belts. Further, although the conveyor 108 is shown as including a single endless belt 114, in other implementations, the conveyor 108 may include additional endless belts. The endless belts 110, 112, and 114 are supported on two or more rollers of the respective conveyors 104, 106, and 108. Although the draper header 100 is illustrated as a rigid or non-folding draper header, the scope of the present disclosure encompasses folding draper headers.

In some implementations the endless belts 110, 112, and 114 may be formed from elastomer-impregnated fabric belts. Generally, the endless belts 110 and 112 may be rotated such that upper surfaces of the endless belts 110 and 112 move inward along the header 100 in respective directions 120 and 122. In this way, material, such as severed crop material, is moved by the endless belts 110 and 112 to the center conveyor 108, which, in turn, uses the endless belt 114 to move the material off of the header 100. For example, the header 100 may offload the material onto a harvester vehicle to which the header 100 is attached. The header 100 also includes a cylindrical conveyor 124. The cylindrical conveyor 124 receives severed crop material from the center conveyor 108 and carries the crop material rearward (i.e., in a direction 126) through an aperture in the frame 102 located between the cylindrical conveyor 124 and the center conveyor 108 and, ultimately, into the harvester vehicle.

In the illustrated example, various cleats 130 are fixed to the surface of each of the endless belts 110, 112, and 114, with the cleats 130 generally extending in a direction transverse to the direction of travel of the respective endless belt 110, 112, or 114, e.g., directions 120, 122, and 126. In some implementations, the cleat 130 may extend less than an entire width of the endless belts 110, 112, and 114. For example, one or more of the cleats 130 may extend only partially across the respective width of the endless belts 110, 112, and 114, and, accordingly, may not extend to a leading edge or a trailing edge of the belts 110, 112, and 114.

The header 100 also includes a cutterbar 132 at a leading edge 133 of the header 100. The cutterbar 132 cuts crop material, such as to sever crop material from a field. The cutterbar 132 extends laterally along the header 100. In some implementations, the header 100 may also include a leading cover arranged between the cutterbar 132 and the endless belts 110, 112, and 114, with the leading cover extending at least partly over a leading edge of at least the belts 110 and 112. As shown in FIG. 1, for example, the header 100 includes an elongated row of interlocking crop ramp segments 134 that extend along the header 100.

As depicted, the header 100 also includes a trailing cover 136, which may be in the form of a back sheet deflector or rear frame cover, separated from the crop ramp segments 134 by a width 138. The trailing cover 136 serves to cover and protect various internal components of the header 100 and also generally defines a trailing end of a crop-carrying region of the header 100. In some implementations, the cleats 130 extend over the entire width 138. In other implementations, the cleats 130 extend over a portion of the width 138.

During a harvesting operation, a harvester vehicle carries the header 100 through an agricultural field in a nominal forward direction 140. As the header 100 is moved across the field, the cutterbar 132 operates to sever the crops at a location adjacent to the ground. The severed crop material generally falls in a trailing direction (i.e., generally opposite the direction 140), onto one or more of the three conveyors 104, 106, and 108. The conveyor 104 on the wing 118 carries the crop material in the direction 120, using the endless belts 110, toward the center of the header 100. The conveyor 106 carries the severed crop material in the direction 122, using the endless belts 112, toward the center conveyor 108, and the center conveyor 108 carries the severed crop material in the direction 126 towards and underneath the cylindrical conveyor 124. The severed crop material from the cylindrical conveyor 124 is transported in the direction 126 through the aperture in the frame 102 of the header 100 and into the agricultural harvester.

In the illustrated example, the conveyor 104 and the conveyor 106 are similarly configured, although the conveyors 104 and 106 carry crop material in opposite directions 120 and 122, respectively. In other implementations, the conveyors 104 and 106 can be configured differently. Generally, however, the description herein of the conveyor 104 is applicable to the conveyor 106, as well as other conveyors of other implementations.

Figure 2:
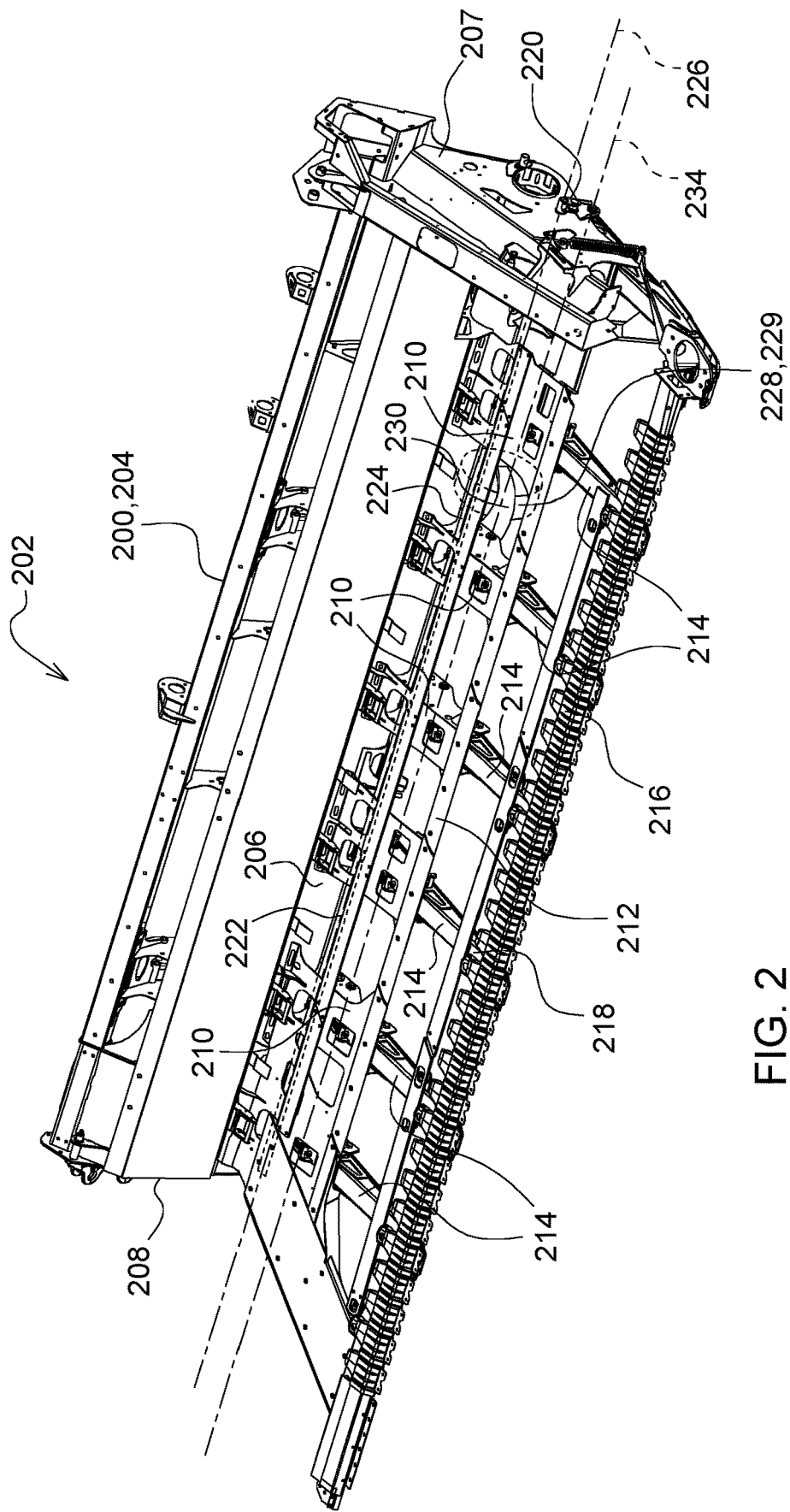
FIG. 2 is oblique view of a portion of a frame of an example header, according to some implementations of the present disclosure.

FIG. 2 is a view of a portion of a frame 200 of a header 202, which may be similar to the header 100. The portion of the frame 200 illustrated corresponds to a portion of a wing 204 of the header 202. The wing 204 may be similar to wing 118 of the header 100. The frame 200 includes a beam 206 extending laterally along the frame 200. A back section 208 is coupled to the beam 206 and extends therefrom. The back section 208 also extends laterally along the frame 200. An outboard side section 207 connects to the beam 206 and the back section 208 and defines a lateral end of the frame 200. A plurality of mounting brackets 210 are also coupled to the beam 206. With the header 202 conventionally oriented, the brackets 210 general extend in a direction corresponding to a forward direction. The frame 200 also includes a laterally extending cross tube 212 that connects to each of the mounting brackets 210. In some implementations, the cross tube 212 may have a square, rectangular, or circular cross-sectional shape and may define a central passage. However, the cross tube 212 may have other cross-sectional shapes. Float arms 214 are pivotably coupled to the mounting brackets 210, and a cutterbar 216 is coupled to distal ends 218 of each of the float arms 214. Similar to the cutterbar 132, the cutterbar 216 is a reciprocating cutterbar.

In some implementations, the mounting brackets 210 and corresponding float arms 214 are laterally separated from adjacent mounting brackets 210 and corresponding float arms 214 by approximately 2.5 feet (ft) (0.8 meters (m)). In other implementations, the lateral separation 215 may be greater than or less than 2.5 ft (0.8 m). In still other implementations, the lateral separation 215 may vary. Thus, in some implementations, the lateral separation 215 between some adjacent mounting brackets 210 and corresponding float arms 214 may be uniform while the lateral separation between other adjacent mounting brackets 210 and corresponding float arms 214 may be non-uniform.

With the header 202 in an unsecured or flexible configuration, each of the float arms 214 are able to pivot independently of the other float arms 214. As a result, when the float arms 214 are in contact with the ground and propelled over the ground, such as during a harvesting operation, each of the float arms 214 is able to follow a topography or contour of the ground. In response to the float arms 214 conforming movement to the contour of the ground, the cutterbar 216 flexes to also conform to the contour of the ground. As a result, a portion of the crop extending from the ground and remaining in a field may be generally consistent, e.g., a height by which the crop remaining in field extends from the ground is generally uniform.

In a rigid configuration in which the float arms 214 are held in an abutting relationship against a portion of the frame 200, such as the cross tube 212, the float arms 214 are prevented from following a contour of the ground, and the cutterbar 216 is maintained in a generally straight and rigid configuration, e.g., the cutterbar 216 maintains a generally straight, unbent shape.

The header 202 also includes a lockout system 220 that is operable to move the float arms 214 and the cutterbar 216 between the flexible configuration and the rigid configuration. In some implementations, the header 202 includes a lockout system 220 for each wing 204. The separate lockout systems 220 are operable to move the float arms 214 and associated portion of the cutterbar 216 of one wing between the rigid configuration and the flexible configuration independently of the float arms 214 and associated portion of the cutterbar 216 of the other wing. Thus, in some implementations, the header 202 may include two lockout systems 220. In other implementations, the header may include a single lockout system 220 for all of the wings of the header 202. In still other implementations, the header 200 may include more than two lockout systems.

The lockout system 220 includes a rotatable component, which, in the example of FIG. 2, is a lockout tube 222. In some implementations, the lockout tube 222 is in the form of a shaft. The lockout tube 222 extends laterally along the header 202 through apertures 224 formed in each of the mounting brackets 210. The lockout tube 222 is rotatable relative to the mounting brackets 210 about a centerline 226.

Figure 3:
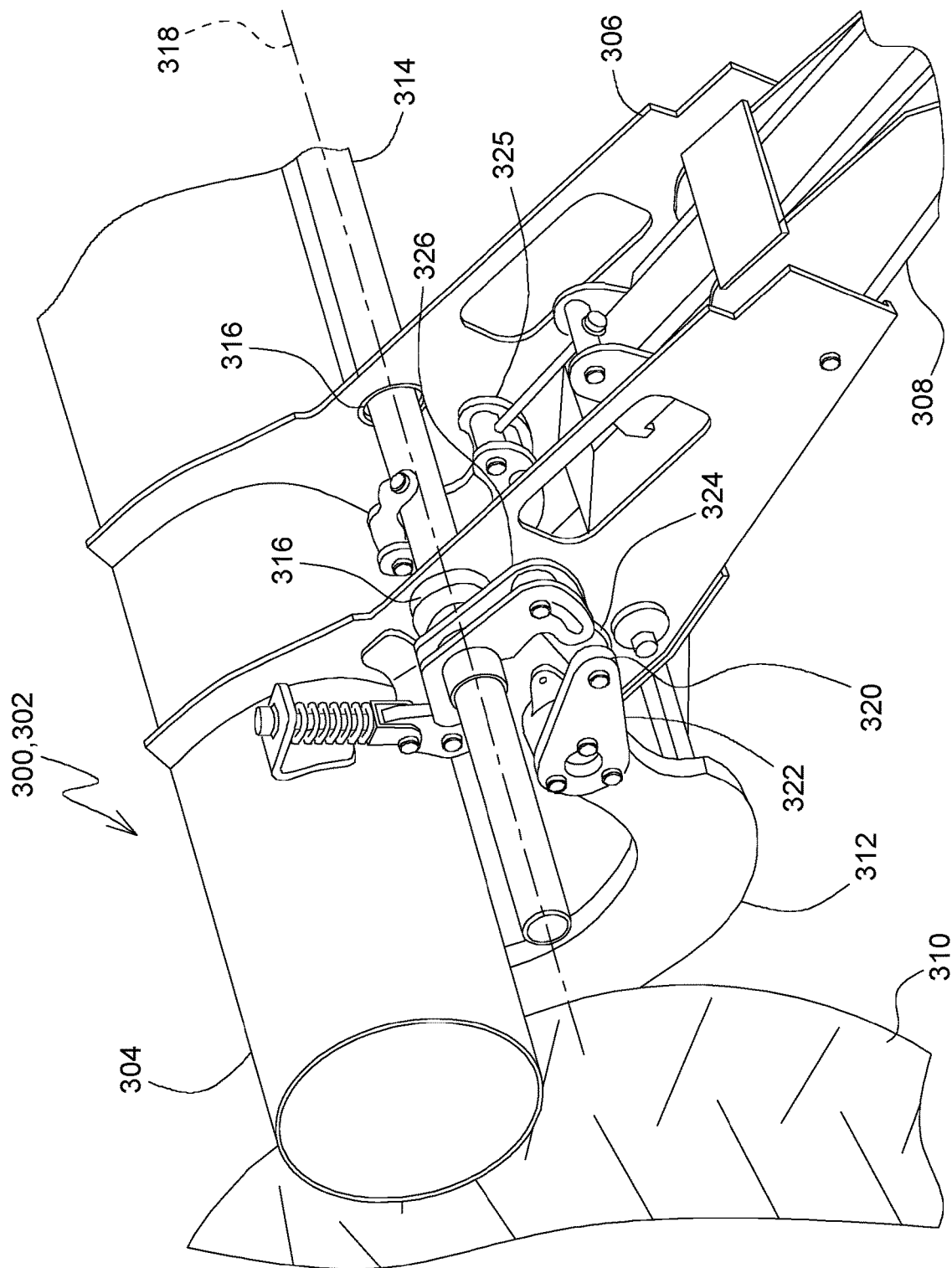
FIG. 3 a detail view of a portion of a frame of an example header, according to some implementations of the present disclosure.

The header also includes gauge wheels 228, as shown in FIG. 3. In some implementations, the header 200 includes two gauge wheels 228 distributed laterally along each wing of the header 200. In other implementations, the header 200 includes fewer or additional gauge wheels 228. FIG. 3 illustrates a single gauge wheel 228, although, as explained earlier, the scope of the disclosure is not so limited.

A gauge wheel assembly 229 includes the gauge wheels 228 and an arm 230 to which the gauge wheels are rotatably coupled. The arms 230 are pivotably coupled to a mounting bracket 210. The gauge wheels assemblies 229 are movable between a retracted position and an extended position. An actuation system 231 couples the gauge wheel assembly 229, via arm 230, to the lockout tube 222 such that extension or retraction of the gauge wheel, such as by rotation of the arm 230 about axis 234, causes rotation of the lockout tube 222 about the centerline 226. The axis 234 extends through a pivot where the arm 230 is coupled to the mounting bracket 210. In the illustrated example, the actuation system 231 is a linkage (shown in more detail in FIG. 4) that extends between and couples the lockout tube 222 and the arm 230.

FIG. 3 is a detail view of a portion of a frame 300 of an example header 302 within the scope of the present disclosure. The frame 300 may be similar to the frame 200. The frame 300 includes a laterally-extending beam 304, similar to beam 206, and a mounting bracket 306, similar to mounting bracket 210. A float arm 308 is pivotably mounted to the mounting bracket 306. A gauge wheel 310 is coupled to the frame 300. The gauge wheel 310 is rotatably coupled to an arm 312, and the arm 312 is pivotably mounted to the mounting bracket 306. A lockout tube 314, similar to lockout tube 222, extends laterally though apertures 316 formed in the mounting bracket 306. The lockout tube 314 is rotatable about a centerline 318, similar to centerline 226, that extends longitudinally along the lockout tube 314. The lockout tube 314 is rotatably coupled to the arm 312 via a linkage 320. In the illustrated example, the linkage includes three links. However, in other implementations, the linkage 320 may include additional or fewer links. The linkage 320 includes a first link 322 fixedly attached to the arm 312, a second link 324 pivotably coupled to the first link 322, and a third link 325 fixedly attached to the lockout tube 314 and pivotably coupled to the second link 324.

The header 302 also includes a lockout system 326 that functions to move the float arms 308 and associated portions of a cutterbar provided at the distal ends of the float arms 308 of the header 302 between a flexible configuration and a rigid configuration. The lockout tube 314 is connected to the lockout system 326 such that rotation of the lockout tube 314 in a first direction causes the lockout system 326 to lockingly position the float arms 308 into the rigid configuration. Conversely, rotation of the lockout tube 314 in a second direction, opposite the first direction, causes the lockout system 326 to move the float arms 308 from the rigid configuration into the flexible configuration.

Although some implementations include a lockout system, such as lockout system 326 described in more detail below, in other implementations, a lockout system may be omitted. Thus, in some implementations, the lockout 314 is coupled directly or indirectly to the float arms 308 without the use of a lockout system.

Figure 4:
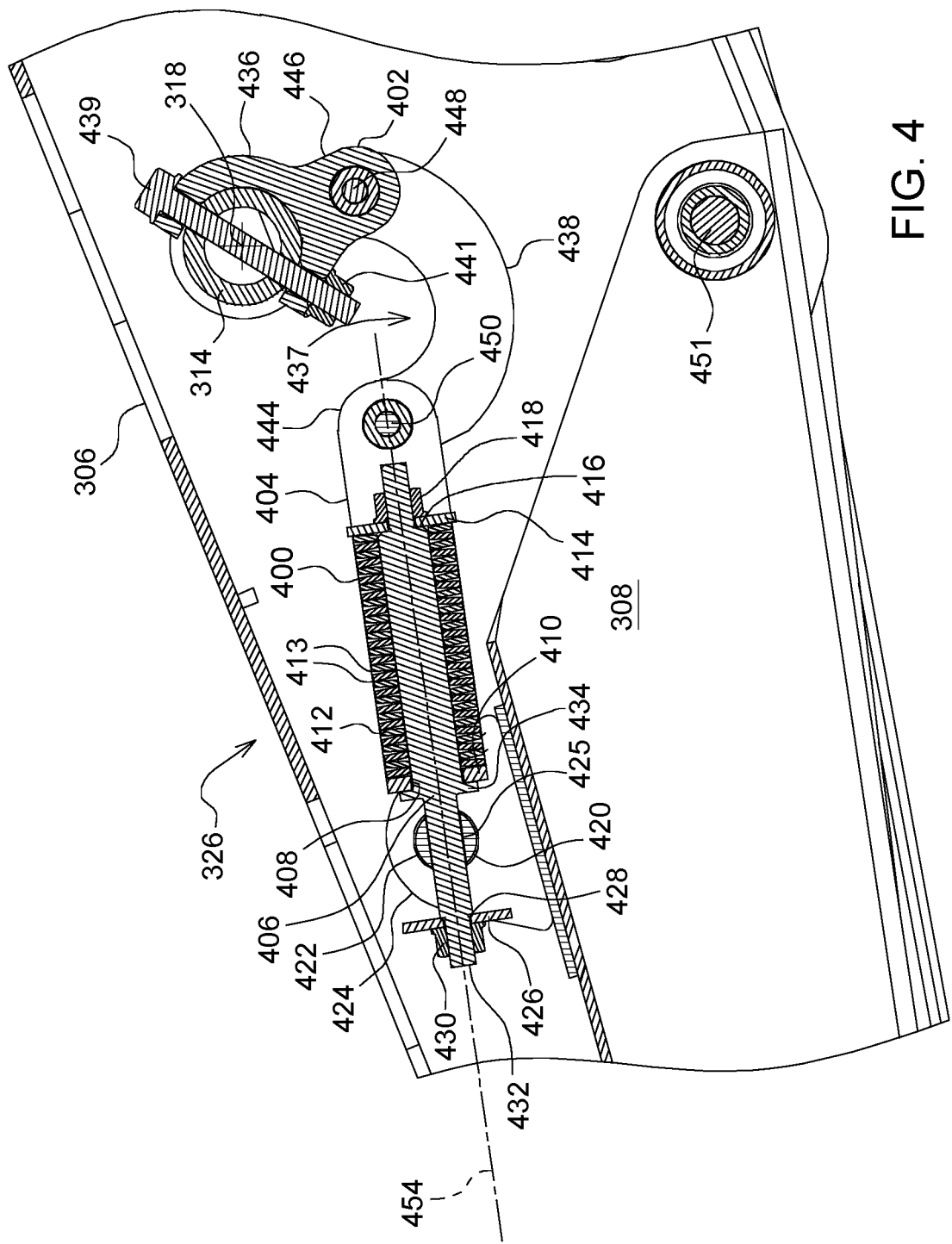
FIG. 4 is cross-sectional view of portions of an example lockout system, according to some implementation of the present disclosure.

FIG. 4 is a cross-sectional view of additional portions of the lockout system 326. The lockout system 326 also includes a tensioner 400 and a linkage 402 coupled to the lockout tube 314. The tensioner 400 includes a bracket 404, a shaft 406 extending through an aperture 408 in a side 410 of the bracket 404, and a biasing component 412 captured on the shaft 406 between the side 410 of the bracket 404 and a flange 414 secured to the shaft 406. In some implementations, the flange 414 may be secured to the shaft between a shoulder 416 and a nut 418 threadably received onto the shaft 406. In other implementations, the flange 414 may be secured to the shaft 406 in other ways, such as by welding, a press fit, or by being integrally formed onto the shaft 406.

In some implementations, the biasing component 412 is a spring, such as a coil spring. In some implementations, the biasing component 412 is a plurality of biasing components. For example, in some implementations, the biasing component 412 is a plurality of Bellville washers 413 stacked along a length of the shaft 406, as shown in FIG. 4. In some implementations, the Bellville washers are arranged in pairs, such that a base of each Bellville washer in a pair abuts each other. Pairs of the Bellville washers may be arranged adjacent to each other along a length of the shaft 406, as shown, for example, in FIGS. 4, 6, and 7. In some implementations, 32 Bellville washers may be used. However, additional or fewer Bellville washers may be used, and the number of Bellville washers may vary depending upon, for example, sizes and masses of the different components of a header.

In still other implementations, the biasing component 412 may be or include a coil spring. For example, in some instances, the biasing component 412 may include a plurality of coils springs. One or more of the coils springs may be received onto the shaft 406. In still other implementations, the biasing component 412 may be another type of spring.

The tensioner 400 is pivotably coupled to the float arm 308 by a pin 420 coupled to the float arm 308. In the illustrated example, the pin 420 extends through apertures 422 formed in a clevis 424 that is attached to the float arm 308. The shaft 406 extends through a bore 425 formed through the pin 420. A flange 426 captures the shaft 406 onto the pin 420. In some implementations, the flange 426 may be a washer secured to the shaft 406 between a shoulder 428 and a nut 430 threadably received onto a threaded portion 432 of the shaft 406. In other implementations, the flange 426 may be secured to the shaft 406 in other ways, such as a press fit or welding, or the flange 426 may be integrally formed on the shaft 406. The shaft 406 also includes an enlarged portion 434 that abuts against the side 410 of the bracket 404. Engagement between the side 410 and the enlarged portion 434 allows the biasing component 412 to be preloaded between the side 410 and the flange 414. In some implementations, the biasing component 412 may not be preloaded.

The preload applied to the biasing component 412 may be selected to ensure a force applied to the float arms 308 of a lockout system 326 by the biasing component 412 lifts the float arms 308 into abutting contact between all of the float arms 308 and a portion of the frame 300, such as a cross tube similar to cross tube 212 shown in FIG. 2. Thus, the preload ensures that a force ultimately provided by the biasing component 412 as the lockout system 326 is moved into the rigid configuration fully actuates all of the float arms 308 notwithstanding any variations in the header 302, such as manufacturing variations that may otherwise prevent all of the float arms 308 from being in abutting contact with the cross tube when the lockout system 326 is in the rigid configuration. As a result, lockout systems of the present disclosure are operable to ensure full retraction of all of the float arms of a header when placed in the rigid configuration without adjustment during manufacturing or sometime later in the field, such as by a user or technician. Thus, the lockout systems and associated headers of the present disclosure reduce maintenance thereto, improves performance of operation of the headers, increases productivity of the headers, and reduces costs of operation of the headers.

The linkage 402 includes a first link 436 coupled to the lockout tube 314 and a second link 438 pivotably coupled to the first link 436 and the bracket 404. In the illustrated example, the first link 436 is attached to the lockout tube 314 with a fastener 439, such as a bolt. However, in other implementations, the first link 436 may be attached to the lockout tube 314 in other ways, such as by welding, interference fit, an adhesive, or by being integrally formed on the lockout tube 314. Also, in the illustrated example, a nut 441 is used to secure the fastener 439 and the first link 436 to the lockout tube 314.

Figure 5:
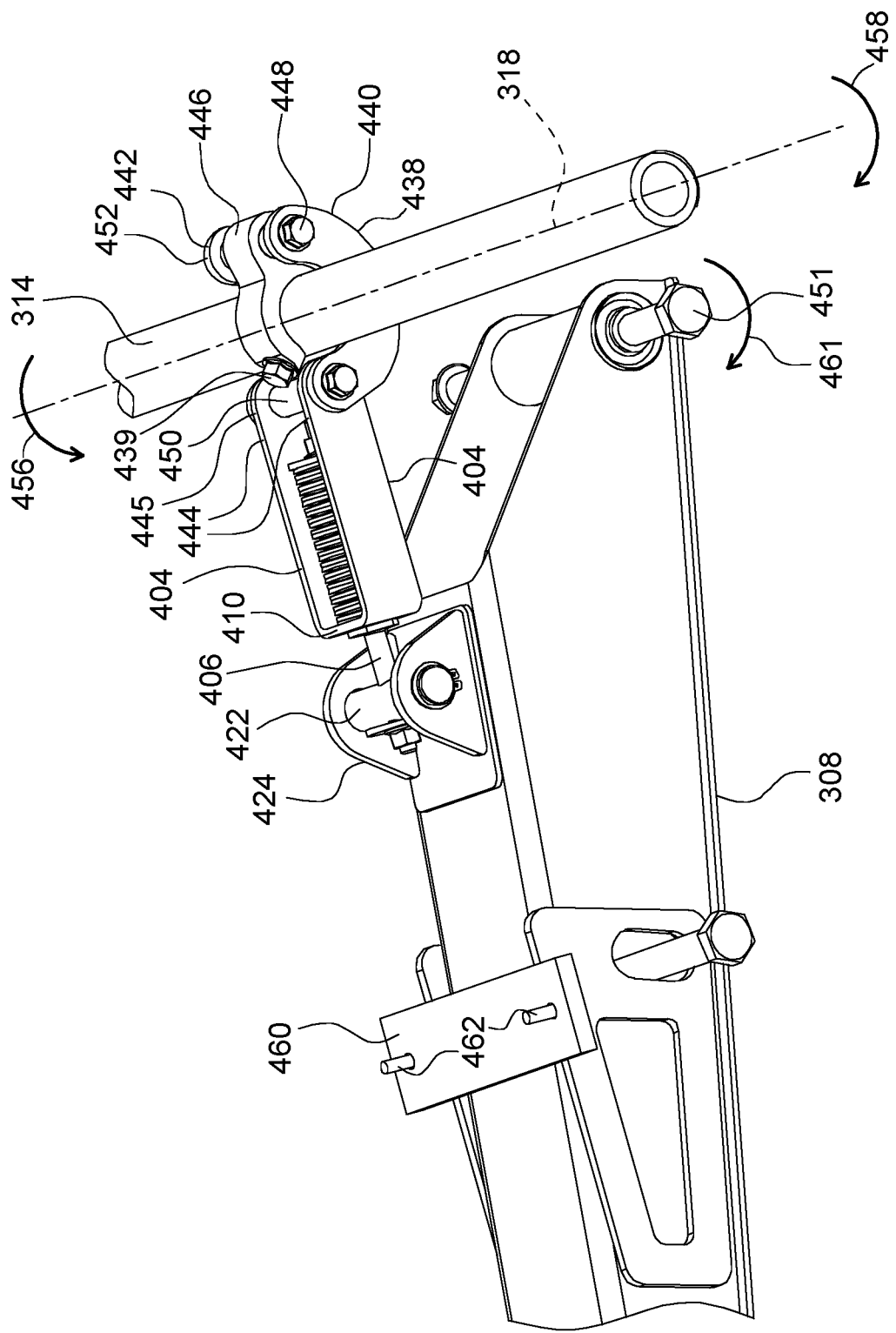
FIG. 5 is an oblique view of the lockout system of FIG. 4.

Referring to FIGS. 4 and 5, the bracket 404 has a general U-shape, and the second link 438 includes a first side 440 and a second side 442. Free ends 444 of the bracket 404 are sandwiched between the first and second sides 440 and 442 at a first end 445 of the second link 438. A tab 446 formed on the first link 436 is disposed between the first and second sides 440 and 442 of the second link 438 at a second end 452 of the second link 438. A pin 448 extends through the first and second sides 440 and 442 at the second end 452 of the second link 438 and the tab 446 of the first link 436 to pivotably couple the first link 436 and the second link 438. A pin 450 extends between the free ends 444 of the bracket 404 and the first and second sides 440 and 442 at the first end 445 of the second link 438 to pivotably couple the second link 438 and the bracket 404. In some implementations, the pins 448 and 450 may be a rod or a fastener, such as a bolt. However, the pins 448 and 450 may have other forms to enable the first link 436 to pivot relative to the second link 438 and the bracket 404 to pivot relative to the second link 438. The float arm 308 is pivotable about a pin 451 that pivotably couples the float arm 308 to the mounting bracket 306. The pin 451 may be, for example, a fastener (e.g., a bolt), a shaft, or other component operable to permit pivoting movement of the float arm 308 relative to the mounting bracket 306. FIG. 5 also shows an impact absorber component 460 that is attached to the frame 300 of the header 302, such as the cross tube, and contacts a float arm 308 when retracted into the rigid configuration. The impact absorber component 460 may be attached to the cross tube with fasteners 462, which may be, for example, bolts, pins, or rivets As shown in FIGS. 4 through 7, the second link 438 has an arcuate shape that provides a relief or recess 437 that receives the lockout tube 314. The recess 437 formed by the arcuate shape receives the lockout tube 314, allowing the centerline 318 of the lockout tube 314 to intersect with centerline 454 of shaft 406, resulting in the elimination of torque in the lockout tube 314, as described in more detail below. In some instances, the centerlines 318 and 454 may be slightly offset due to slight variations in size of the components, movement of the different components, or variations in components, for example. These slight variations may produce an offset between the centerlines 318 and 454 that, in some cases, may be unavoidable. However, for the purposes of the present disclosure, intersection of the centerlines 318 and 454 is intended to encompass the slight offsets therebetween which may occur.

As shown in FIG. 5, rotation of the lockout tube 314 in the direction of arrow 456 to a first position results in the float arms 308 being placed into a fully retracted position, which corresponds to the rigid configuration of the float arms 308 and cutterbar, such as cutterbar 216. Rotation of the lockout tube 314 in the direction of arrow 458 to a second position results in the float arms 308 being placed in a fully extended position, which corresponds to the flexible configuration of the float arms 308 and cutterbar.

Figure 6:
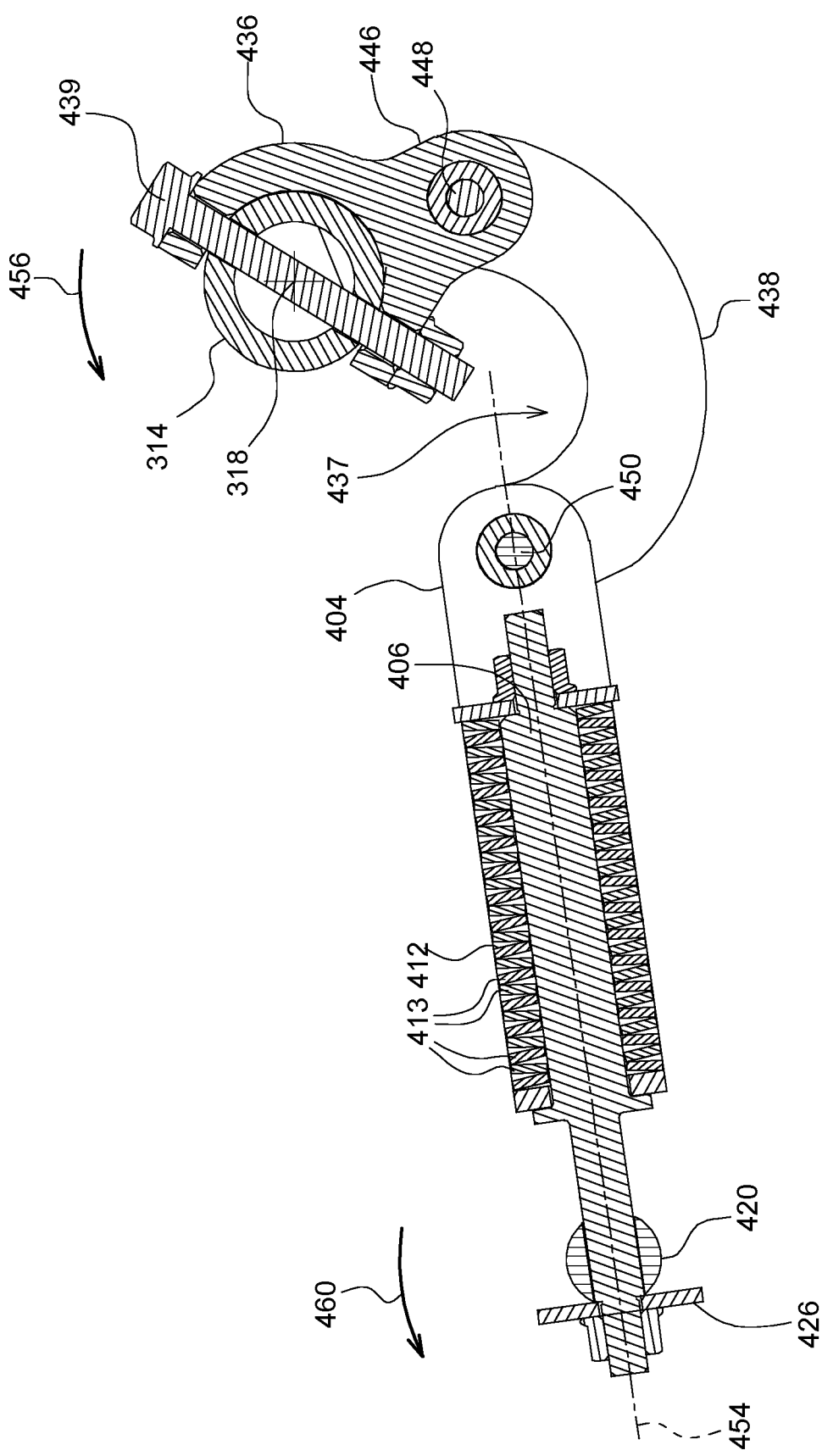
FIG. 6 is a detailed, cross-sectional view of a portion of the lockout system of FIG. 4.
Figure 7:
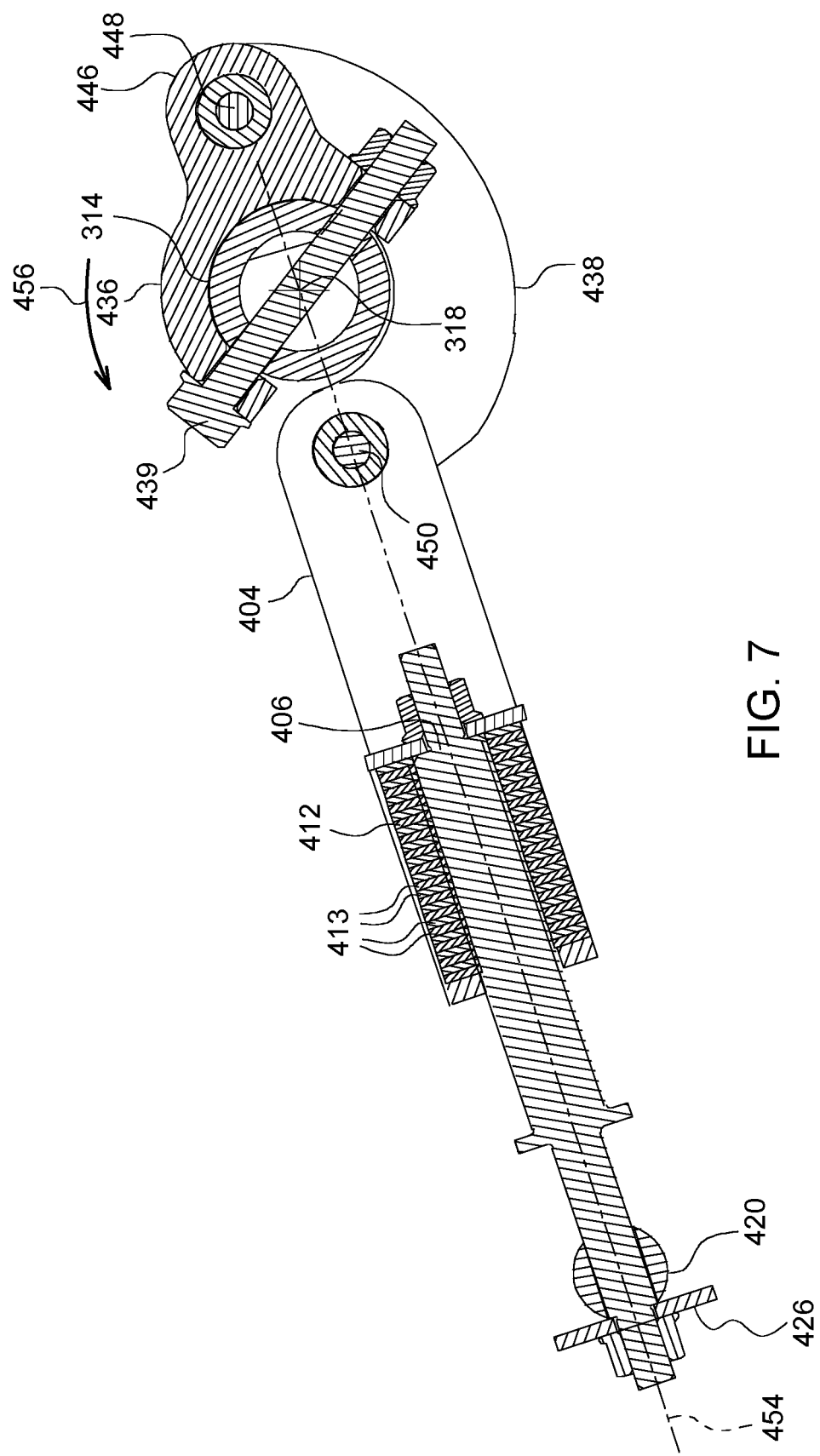
FIG. 7 is another detailed, cross-sectional view of a portion of the lockout system of FIG. 4.

FIGS. 4, 6, and 7 illustrate actuation of the lockout system 326 between the flexible configuration and the rigid configuration. In FIG. 6, the lockout system 326 is in the flexible configuration in which the floating arms 308 are in a fully extended. As a result, the float arms 308 are freely pivotably about pin 451, and each of the float arms 308 coupled to the lockout system 326 are able to pivot independently of the other float arms 308. Although the present example describes a lockout system that can be included on a single wing of a header, in other implementations, a single lockout system operable to position all of the float arms of a header between the flexible configuration and a rigid configuration may be used.

Referring to FIGS. 4 and 6, the lockout tube 314 is angularly oriented in the second position such that the biasing component 412 is unloaded, other than a preload that may be applied to the biasing component 412. With the lockout tube 314 in the second position, the float arms 308 are freely pivotable about the pin 451, allowing the float arms 308 to follow a contour of the ground when the float arms 308 are placed in contact with the ground. As the lockout tube 314 is rotated in the direction of arrow 456, the shaft 406 translates relative to and rotates with the pin 420. As a result, the shaft 406 is both rotated and translated towards the lockout tube 314. As shown in FIG. 6, the shaft 406 is displaced to cause the flange 426 to come into contact with the pin 420. Further rotation of the lockout tube 314 in the direction of arrow 456 results in further displacement and rotation of the shaft 406, which, in turn, causes further compression of the biasing component 412.

With the flange 426 in contact with the pin 420, as the lockout tube 314 continues to be rotated in the direction of arrow 456, the float arm 308 is pivoted about the pin 451 in the direction of arrow 461. Moreover, as the shaft 406 is pivoted in the direction of arrow 460, an amount of torque applied to the lockout tube 314 decreases as the centerline 454 of the shaft 406 approaches the centerline 318 of the lockout tube 314.

FIG. 7 shows the lockout system 326 in the rigid configuration. As shown in FIG. 7, the lockout tube 314 is moved into the first position. As the lockout tube 314 is moved from the position show in FIG. 6 to the position shown in FIG. 7, the float arms 308 are retracted as a result of the contact between the flange 426 and the pin 420. With the locking system 326 in the rigid configuration, the float arms 308 are fully retracted and in abutting contact with the cross tube, such as cross-tube 212, or another component of the frame 300; the lockout tube 314 resides in the curved recess 437 formed by the second link 438; and the centerline 454 of the shaft 406 intersects the centerline 318 of the lockout tube 314. As a result of the intersection of the centerline 454 and the centerline 318, toque applied to the lockout tube 314 is reduced to approximately zero. Further, with the float arms 308 in the rigid configuration, the cutterbar is also placed into a straight and rigid configuration.

With the torque applied to the lockout tube 314 being effectively zero when the float arms 308 are in the retracted and rigid configuration, a size of lockout tube 314 may be reduced, which results in a weight, size, and cost reduction. Additionally, compression of the biasing component 412 provides a force that is sufficient to retract all of the float arms 308 into abutting contact with a component of the frame 300, such as a cross-tube similar to cross-stube 212, notwithstanding any dimensional variations imparted to the frame 300 during manufacturing, for example. Consequently, the lockout system 326 is operable to actuate all the float arms 308 into contact with a portion of the frame 300 without preliminary adjustment during manufacturing or subsequent adjustment when the header has entered use. Thus, the lockout system 326 avoids an adjustment preformed during manufacturing or sometime thereafter, such as by a technician or user, to ensure full actuation of the float arms 308 into the rigid configuration.

Figure 8:
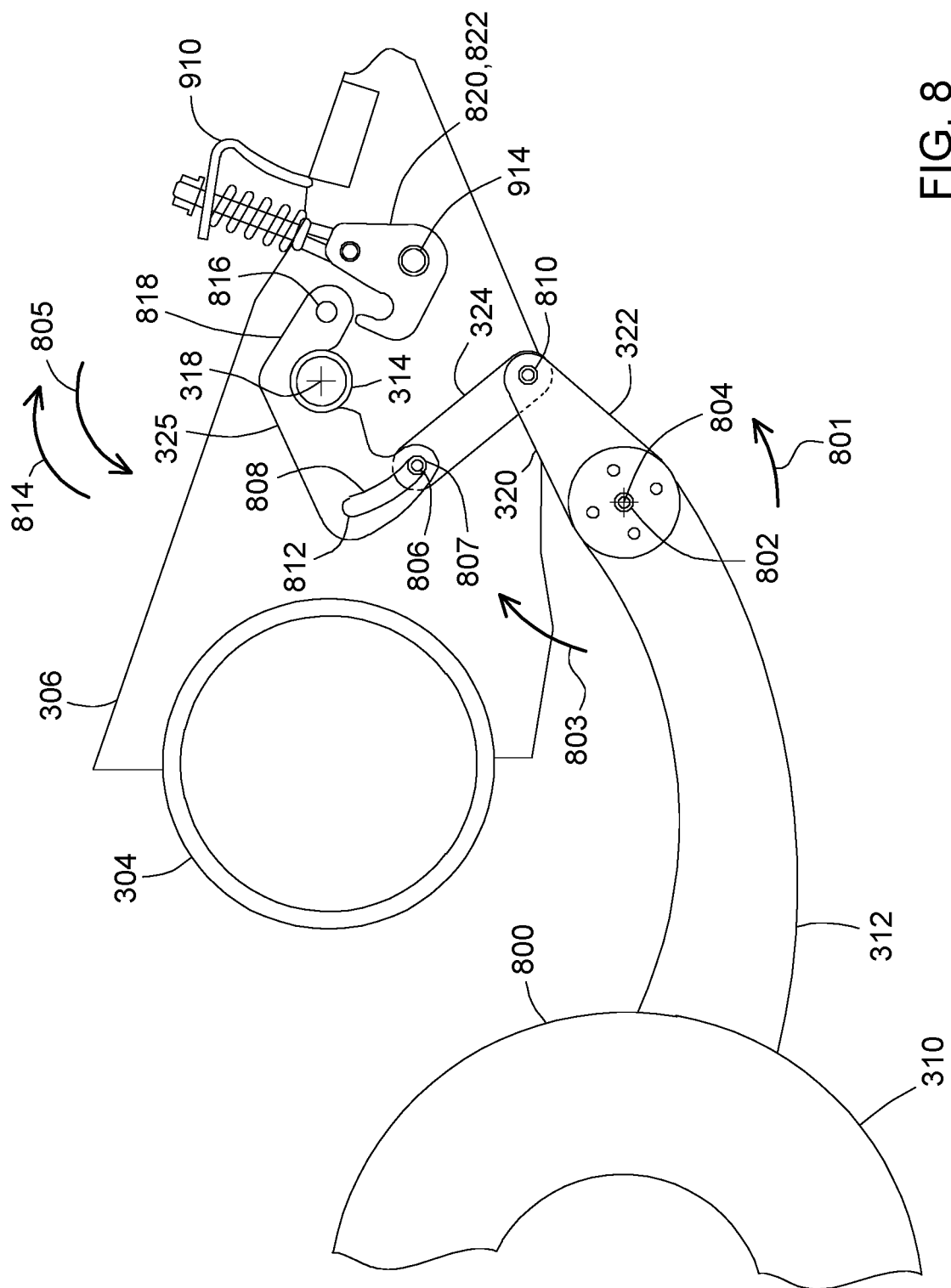
FIG. 8 is a side view of a portion of an example header with an associated gauge wheel in a retracted position, according to some implementations of the present disclosure.
Figure 9:
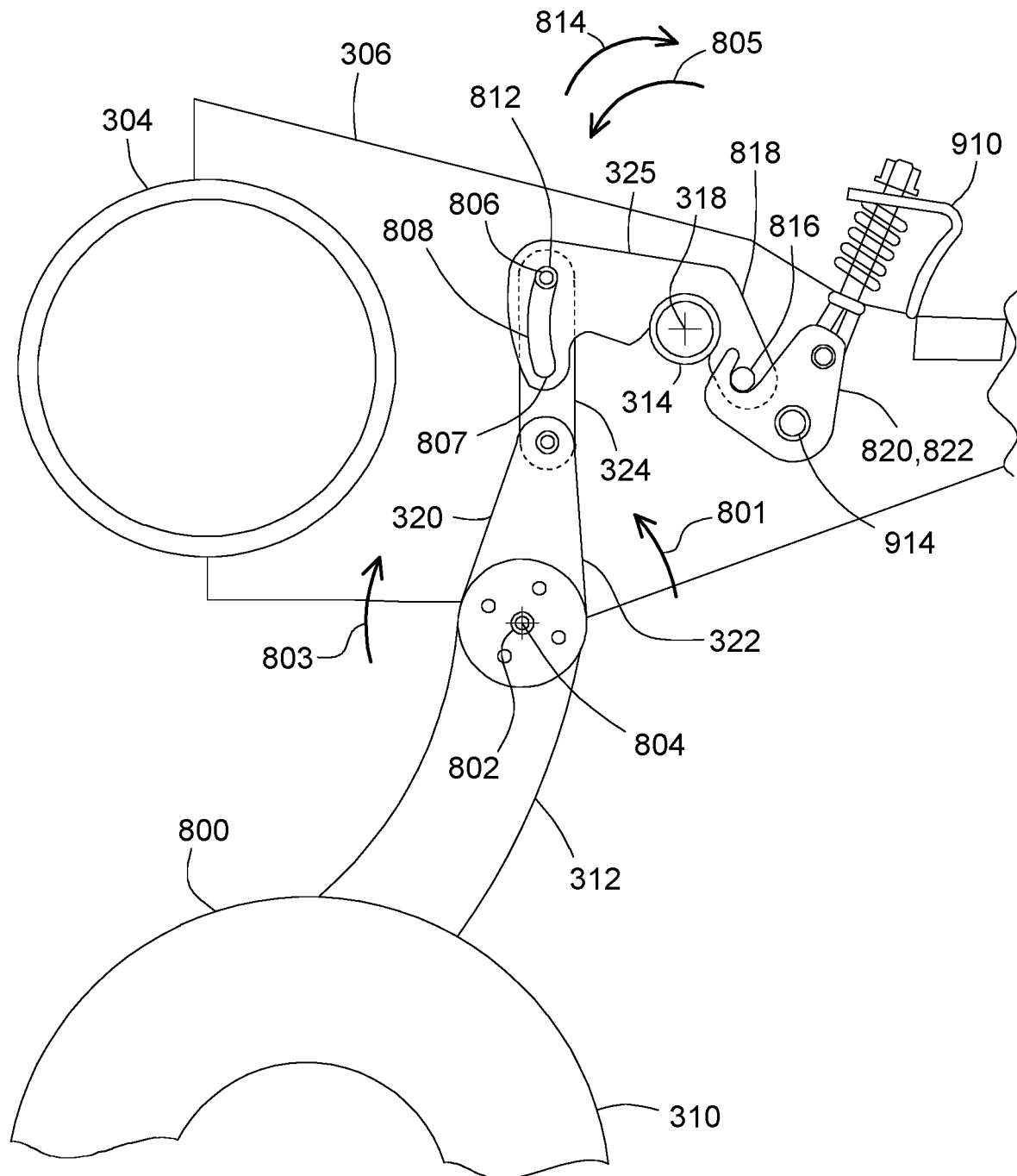
FIG. 9 is a side view of the portion of the example header of FIG. 8 with the associated gauge wheel in an extended position.

Automatic actuation of a lockout system, which may be similar to lockout system 326, in response to extension and retraction of a gauge wheel is described with reference to FIGS. 8 and 9. FIG. 8 is a side view of a portion of the example header 300 with the gauge wheel 310 in a retracted position, and FIG. 9 is a side view of the portion of the header 300 with the gauge wheel 310 in an extended position. The gauge wheel 310 and arm 312 define a gauge wheel assembly 800. The gauge wheel assembly 800 is pivotably coupled to the mounting bracket 306 at a pivot 802 and is rotatable about a pivot axis 804. The pivot 802 is defined by a shaft, bolt, or other component on which the gauge wheel assembly 800 rotates.

The linkage 320 connects the gauge wheel assembly 800 and the lockout tube 314 and, hence, the lockout system 326. The second link 324 includes a pin 806 that is received into and a slot 808 defined by the third link 325. The pin 806 is slidable within the slot 808. In other implementations, the pin 806 and slot 808 are omitted, and the second link 324 and third link 325 are pivotably connected.

When the gauge wheel assembly 800 is deployed from the stowed or retracted position, such as by an input made by an operator of a header 300 or agricultural vehicle to which the header 300 is coupled, the gauge wheel assembly 800 rotates in a direction of arrow 801 about the pivot axis 804. In some instances, an actuator is used to position the gauge wheel assembly 800 between the retracted position and the extended position. In some implementations, the actuator is a hydraulic cylinder, a pneumatic cylinder, an electrically operated linear actuator, a rotary actuator, or some other actuator that is operable to move one or more gauge wheel assemblies between a retracted position and an extended position. In response, the second link 324 pivots relative to the first link 322 at pivot 810 while the pin 806 of the second link 824 slides within the slot 808. As a result of the relative, sliding movement of the second link 324 and the third link 325 coupled to the lockout tube 314, the lockout system 326 remains in an unaltered condition. In some instances, the third bracket 325 is fixedly attached to the lockout tube 314, such as with a fastener (e.g., a bolt) or welding, friction fit, keyed engagement, spline engagement, or by being integrally formed with the lockout tube 314. Thus, in the illustrated implementation, the lockout system 326 remains in an unlocked condition, resulting in the float arms 308 being in an extended or flexible condition, during a portion of the deployment of the gauge wheel assembly 800. When the pin 806 reaches a first end 812 of the slot 808, the send link 324 engages the third link 325, causing the third link 325 and lockout tube 314 to rotate about centerline 318 in the direction of arrow 814.

In some implementations, the second link 324 and the third link 325 engage each other (i.e., when the pin 806 of the second link 324 engages the first end 812 of the slot 808 of the third link 825) at selected amount articulation of the gauge wheel assembly 800 between the retracted position and the extended position. For example, in some implementations, the second link 324 and the third link 325 engage at an amount of articulation that results in the float arms 308 and the cutterbar of the header 302 being in the rigid configuration and 90 percent of articulation of the gauge wheel assembly 800. In other implementations, the selected amount of articulation may be greater than or less than 90 percent. In some implementations, the second link 324 engages the third link 325 when the gauge wheel assembly 800 reaches a selected amount of articulation. For example, in some implementations, the second link 324 and the third link 325 engage each other when the gauge wheel assembly 800 reaches 90 percent of articulation from the retracted position to the extended position. Consequently, in such examples, over the remaining 10 percent of articulation, the lockout system 326 moves the float arms 308 and cutterbar of the header 302 from the flexible configuration to the rigid configuration. Again, in other implementations, the selected amount of articulation at which the second link 324 engages the first link 325 may be greater than or less than 90 percent.

As mentioned above, when the second link 324 and the third link 325 engage, the third link 325 rotates in the direction of arrow 814, rotating the lockout tube 314 also in the direction of arrow 814. As the lockout tube 314 approaches full rotation (at which point the float arms 308 are in the rigid configuration), a pin 816 included on a bracket 818 coupled to the lockout tube 314 engages a retainer assembly 820. In some instances, the bracket 818 forms part of the third link 325. The retainer assembly 820 includes a retainer 822 that functions to capture and retain the bracket 818, locking the lockout tube 314 and maintaining the associated float arms and cutterbar in the rigid configuration, as shown in FIG. 9.

In the illustrated example of FIGS. 8 and 9, the float arms and cutterbar are locked in the rigid configuration within the final ten percent of extension travel of the gauge wheel assembly 800. That is, a range of motion of the gauge wheel assembly 100 is defined between the retracted position and the extended position. As the gauge wheel assembly 800 reaches a position at approximately 90 percent of travel of the range of motion from the retracted position to the extended position, the float arms and cutterbar begin to transition between the flexible configuration and the rigid configuration. By the time the gauge wheel assembly 800 reaches a position corresponding to 100 percent of ravel of the range of motion, the float arms and cutterbar are locked into the rigid configuration.

In other implementations, a location along the range of travel of the gauge wheel assembly 800 where the float arms and cutterbar begins to transition from the flexible configuration to the rigid configuration may be any desired position. For example, in some instances, transition of the float arms and cutterbar from the flexible configuration to the rigid configuration is completed within the first 15 percent of the range of motion of the gauge wheel assembly 800. In other instances, the transition from the flexible configuration to the rigid configuration may begin at other points along the range of travel, such as 10 percent, 20 percent, 25 percent, 30 percent, or 40 percent of the range of travel. In still other implementations, the transition from the flexible configuration to the rigid configuration may begin at other positions. Similarly, the point along the range of movement at which the float arms and cutterbar reach the rigid configuration may be any selected point. Further, a size of a portion of the range of movement over which the float arms and cutterbar transition from the flexible configuration to the rigid configuration may be any desired amount. For example, the transition may occur over five percent, 10 percent, or 15 percent of the range of motion of the gauge wheel assembly from the retraced position to the extended position. In other implementation, a different amount of the range of motion may be used.

Still further, although numerous examples are provided in the context of moving the float arms and cutterbar into the rigid configuration from the flexible configuration, this description is also applicable to movement of the float arms and cutterbar between the rigid configuration to the flexible configuration. For example, the float arms and cutterbar may begin to transition at the 90 percent point of the range of motion of the gauge wheel assembly 800 from the extended position to the retracted position. In other implementations, the transition may occur at other points along the range of motion, such as at 10 percent, 20 percent, 25 percent, 30 percent, or 40 percent of the range of travel. However, in other instances, the transition may initiate at other points along the range of motion. Further, in some implementations, the same point along the range of motion is used as the point where the transition occurs from the flexible configuration to the rigid configuration and vice versa.

Figure 10:
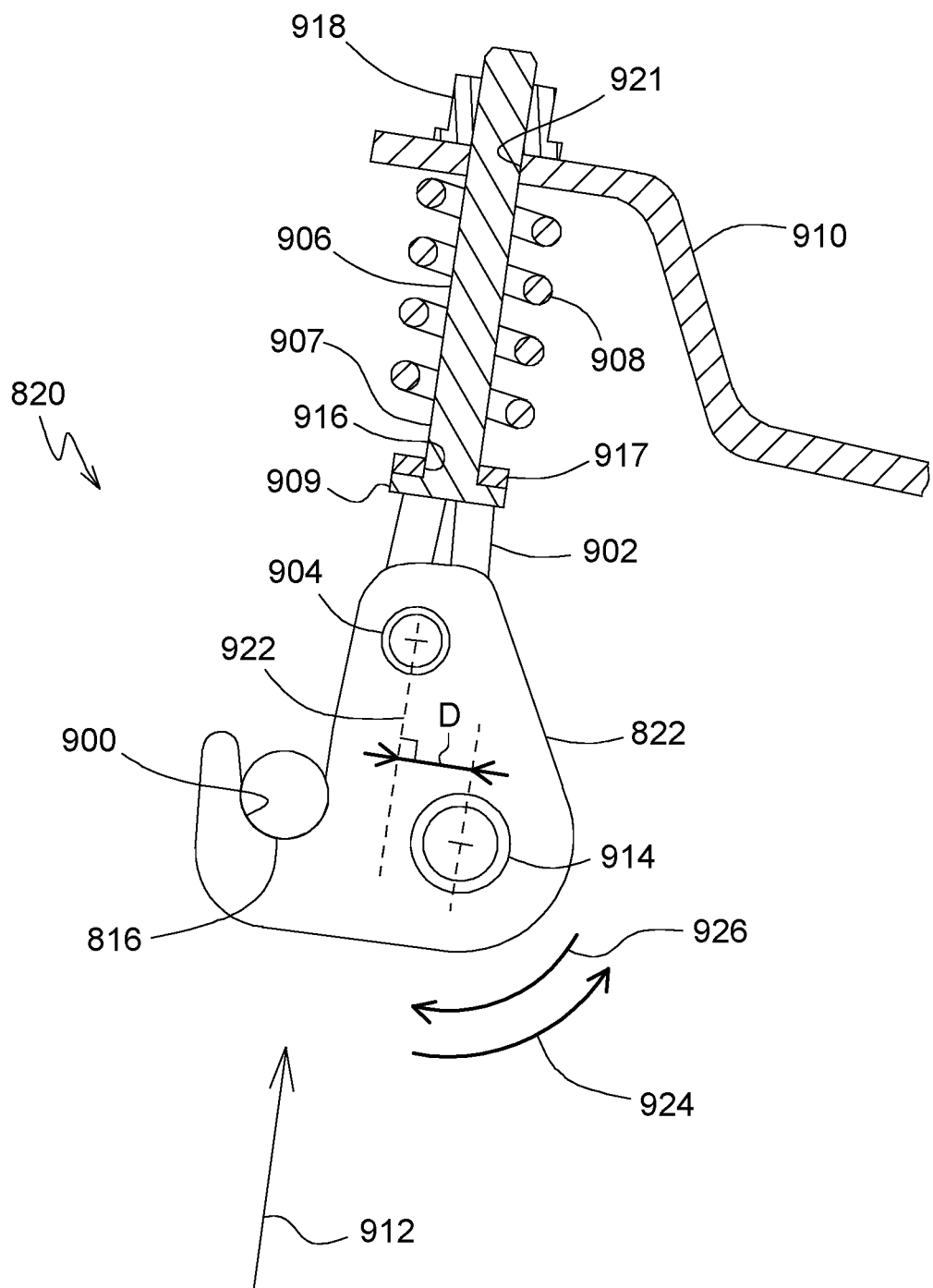
FIG. 10 is a detailed view of an example retainer assembly, according to some implementations of the present disclosure.
Figure 11:
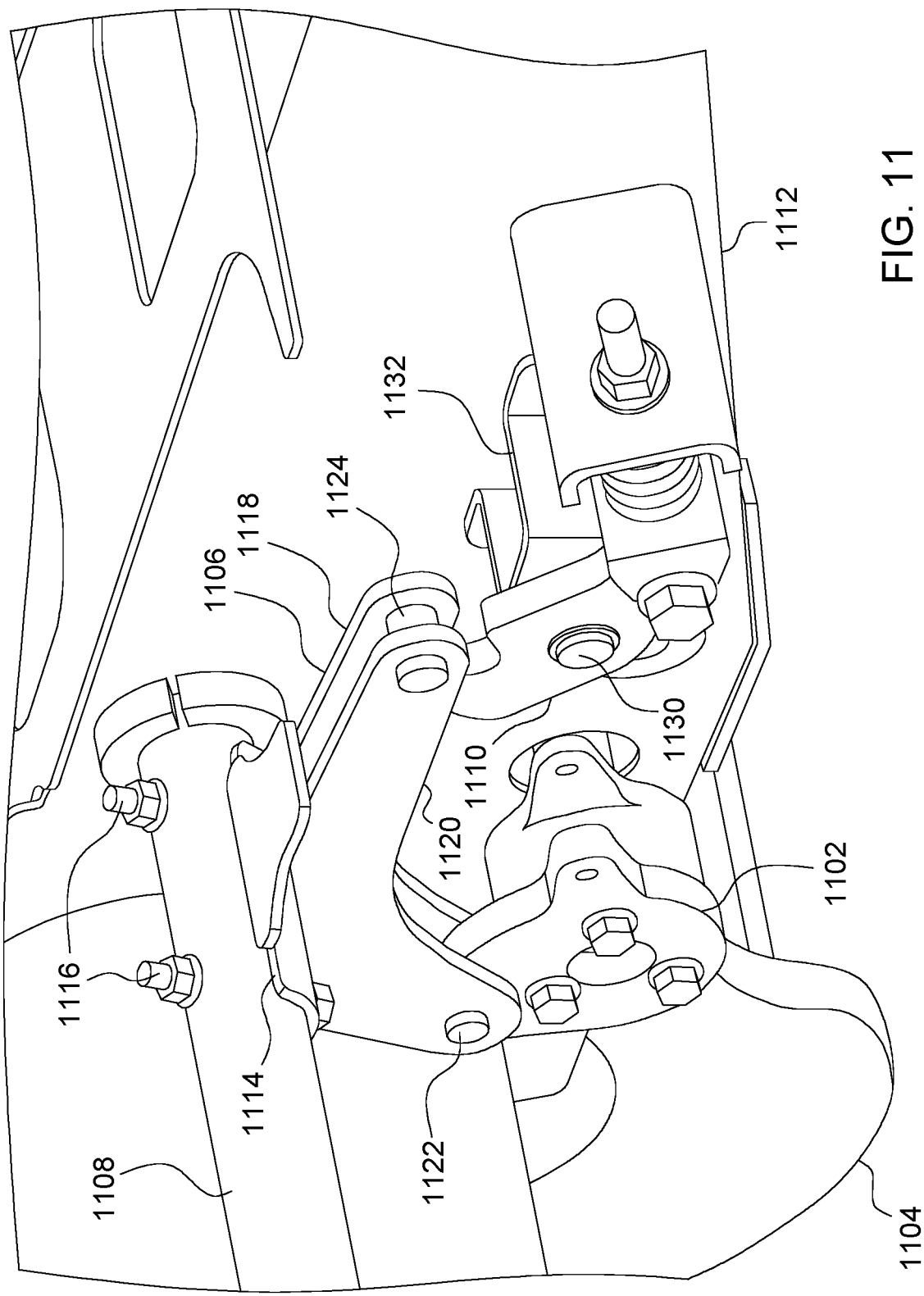
FIG. 11 is a detailed view of another example actuation system, according to some implementation of the present disclosure.
Figure 12:
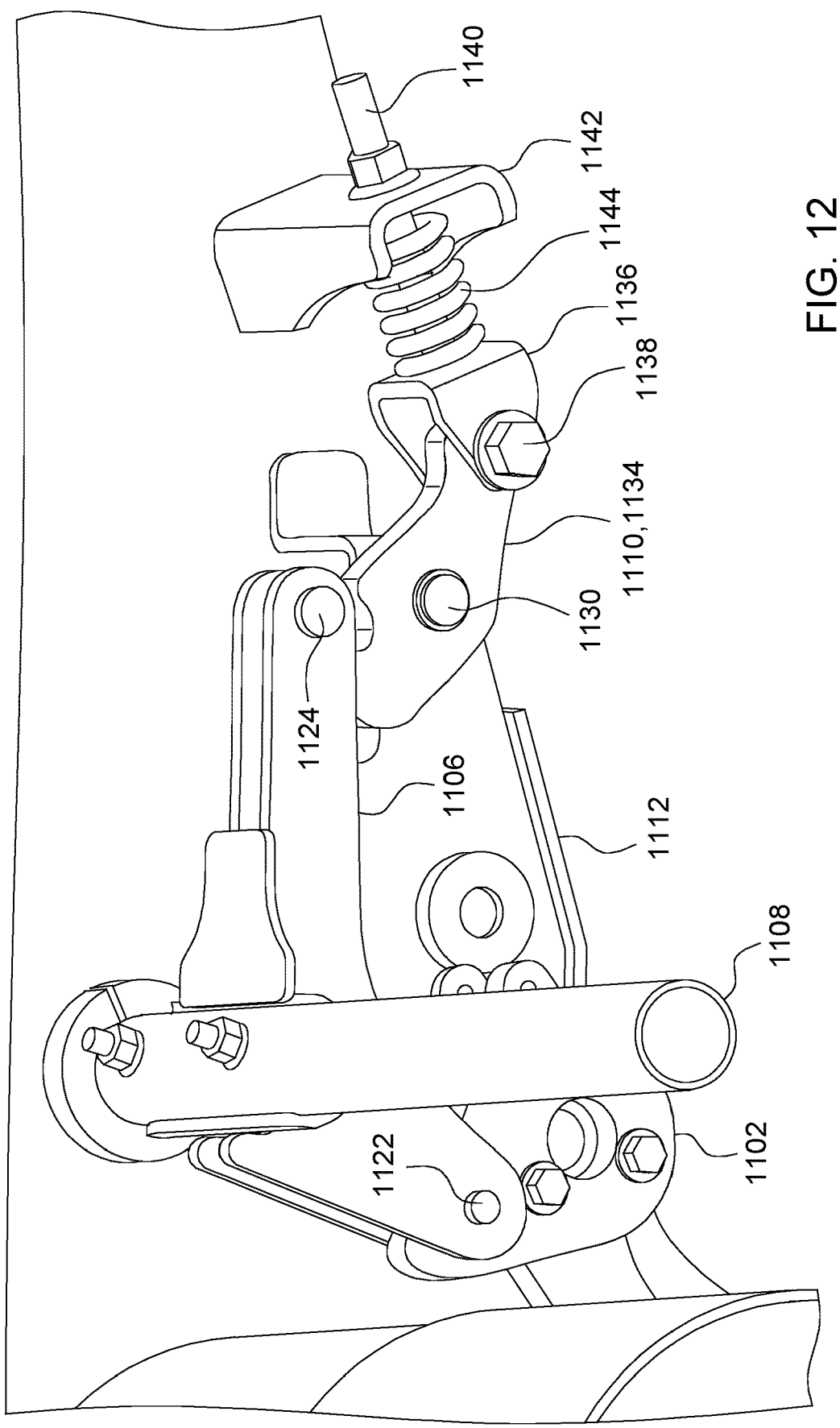
FIG. 12 is another detailed view of the actuation system of FIG. 11.

Referring to FIGS. 9 and 10, as the float arms and cutterbar are placed into the rigid configuration, the pin 816 provided on the bracket 818 is received into a recess 900 formed in the retainer 822 of the retainer assembly 820. A portion 902 of the retainer 822 forming a part of the recess 900 extends partially around the pin 816. That is, in some implementations, the recess 900 extends more than 180 degrees around a perimeter of the pin 816 so that the pin 816 remains retained within the recess 900, as described in more detail below.

The retainer assembly 820 includes the retainer 822 that defines the recess 900, a bracket 902 pivotably coupled to the retainer 822 at a pivot 904, a rod 906 extending from the bracket 902, and a spring 908 retained on the rod 906. The rod 906 is coupled to a bracket 910, and the spring 908 is captured between the brackets 902 and 910. In some implementations, the spring 908 is preloaded (e.g., stretched) between the brackets 902 and 910, causing the spring 908 to impart a pulling force on the bracket 902 that pulls the bracket 902 in the direction of arrow 912. The retainer 822 is pivotably coupled to the mounting bracket 306 at a pivot 914.

The rod 906 includes an elongated portion 907 and an enlarged portion 909. The elongated portion 907 extends through an opening 916 formed in a flange 917 of the bracket 902. The enlarged portion 909 abuts the flange 917 of the bracket 902. The rod 906 is retained on the bracket 902 by engagement between the enlarged portion 909 of the rod 906 and the flange 917 of the bracket 902, and the rod 906 is retained on the bracket 910, such as by a fastener 918. For example, in some instances, an end of the rod 906 is threaded and threadingly mates with a fastener 920, such as a nut. Consequently, the rod 906 is captured between brackets 902 and 910. In some implementations, the rod 906 and the bracket 902 form an integral component.

The spring 908 is secured to the bracket 902 and the bracket 910 such that the spring 908 is stretched between the bracket 902 and bracket 910. For example, in some implementations, the spring 908 engages the enlarged portion 909 of the rod 906, such as an end surface 919 of enlarged portion. Further, the elongated portion 907 of the rod 906 extends through and is slidable within an opening 921 formed in the bracket 910.

As the pin 816 is received into the recess 900, the pin 816 engages to retainer 822, causing the retainer 822 to pivot about the pivot 914 a few degrees in the direction of arrow 924. Because the pivots 904 and 914 are offset from each other by an amount D relative to a line 922 that is parallel to a direction of force applied by the spring 908 (which, in this example, passes through a centerline of the rod 906 and a center of the pivot 904), causes further expansion of the spring 908 (i.e., further stretching of the spring 908). As a result, a force generated by the spring 908 increases, generating a moment that biases the retainer 822 to move in a direction of arrow 926 about the pivot 914. When the pin 816 is fully received into the recess, the retainer 822 rotates back in the direction of arrow 926 in response to the generated moment and captures the pin 816 in the recess 900. The shape of the recess 900 in combination with the moment created by the biasing force produced by the spring 908 captures and prevents the pin 816 from being removed from the recess 900. Consequently, the retainer assembly 820 captures the pin 816 and the moment generated by the spring 908 (i.e., the biasing of the retainer 822 in the direction of arrow 926 about the pivot 914) maintains the float arms and cutterbar in the rigid configuration.

In other implementations, the spring 908 is placed in a compressed state, as opposed to a stretched state. For example, relocating the pivot 914 to a location between the recess 900 and the line 922 causes the spring 908 to be compressed in response to rotation of the retainer 822 in the direction of arrow 924. In such instances, the spring 908 may be preloaded by placing the spring 908 in compression. Thus, the spring 908 may be placed in tension (i.e., stretched) or compression to provide the locking functionality of the retainer assembly 820, such as by altering a position of the pivot 914 relative to the recess 900 and the line 922.

With continued reference to FIGS. 9 and 10, as the gauge wheel assembly 800 is retraced (i.e., by the rotation of the gauge wheel assembly 800 in the direction of arrow 803 about pivot axis 804 from the extended position to the retracted position), the pin 806 slides within the slot 808 as the second link 324 moves relative to the third link 325. As the gauge wheel assembly 800 continues to rotate in the direction of arrow 803, the pin 806 reaches and engages the second end 807 of the slot 808, causing engagement of the second link 324 and the third link 325. In response, the third link 325 and bracket 818 rotate in the direction of arrow 805 about centerline 318. In turn, the pin 816 overcomes retention by the retainer 822 and is removed from the recess 900, and the float arms and cutterbar are released from the rigid configuration. Removal of the pin 816 from the recess 900 cause a slight rotation of the retainer 822 about pivot 914 in the direction of arrow 924. The biasing force generated by the spring 908 in response causes the retainer 822 to rotate in the direction of arrow 926 upon release of the pin 816. As a result, the float arms and cutterbar are moved from the rigid configuration to the flexible configuration.

FIGS. 11-14 illustrate another example actuation system 1100 for actuating a lockout system that may be similar to the lockout system 326, described earlier. The actuation system 1100 includes a lever 1102 coupled to a gauge wheel assembly 1104 (which may be similar to the gauge wheel assembly 229 or gauge wheel assembly 800), a rocker arm 1106 coupled to a lockout tube 1108 (which may be similar to lockout tube 314), and a retainer 1110 that is pivotably coupled to a mounting bracket 1112 (which may be similar to the mounting bracket 306). The lockout tube 1108 is coupled to the lockout system in manner that may be similar to the manner described above with respect to lockout tube 314 and lockout system 326. Rotation of the lockout tube 1108 operates to actuate the lockout system to move one or more float arms (which may be similar to float arms 308) and a cutterbar (which may be similar to cutterbar 132) between a rigid configuration and a flexible configuration, as described earlier.

In the illustrated example, the rocker arm 1106 includes a semicircular portion 1114 that abuts the lockout tube 1108, and the rocker arm 1106 is secured to the lockout tube 1108 using fasteners 1116 that extend through the lockout tube 1108 and the semicircular portion 1114. In other implementations, the rocker arm 1106 and the lockout tube 1108 can be joined in other ways, such as by welding or by using an adhesive or by integrally forming the rocker arm 1106 with the lockout tube 1108. As shown, the rocker arm 1106 includes first and second sides 1118 and 1120, laterally offset from each other, with first and second pins 1122 and 1124 extending therebetween. The first and second pins 1122 and 1124 engage respective recesses 1126 and 1128 formed in the lever 1102 and retainer 1110, as described in more detail below.

The retainer 1110 is pivotable on the mounting bracket 1112 about a pivot 1130. In the illustrated example, the retainer 1110 is pivotably mounted the mounting bracket 1112 via bracket 1132. During actuation of the actuation system 1100, the lever 1102 and the retainer 1110 are receivable between the first and second sides 1118 and 1120 of the rocker arm 1106.

The retainer 1110 forms part of a retainer assembly 1134. The retainer assembly 1134 includes the retainer 1110, a bracket 1136 pivotably coupled to the retainer 1110 at a pivot 1138, a rod 1140 captured between the bracket 1136 and a bracket 1142 attached to the mounting bracket 1112, and a spring 1144 retained on the rod 1140 between the bracket 1136 and the bracket 1142. The rod 1140 includes an elongated portion 1146 and an enlarged portion 1148. The elongated portion 1146 extends through an opening 1150 formed in a flange 1152 of the bracket 1136 and through an opening 1154 formed in the bracket 1142. The rod 1140 is retained on the bracket 1142 by a fastener 1156. For example, in some instances, an end of the rod 1140 is threaded and threadingly mates with the fastener 1156, which may be a nut. Consequently, the rod 1140 is captured between brackets 1136 and 1142. A position of the fastener 1156 along the elongated portion 1146 of the rod 1140 defines how far the bracket 1136 is able to move away from the bracket 1142 and, thus, how far the spring 1144 is able to expand. In some implementations, the rod 1140 and the bracket 1136 are integrally formed.

In some implementations, the spring 1144 is preloaded (e.g., compressed) between the brackets 1136 and 1142, causing the spring 1144 to impart a pushing force on the bracket 1136 that pushes the bracket 1136 in the direction of arrow 1158 (parallel to centerline 1160 of the rod 1140), tending to rotate retainer 1110 in the direction of arrow 1162 about pivot 1130. The retainer 1110 is pivotably coupled to the mounting bracket 1112 at a pivot 1130.

Figure 13:
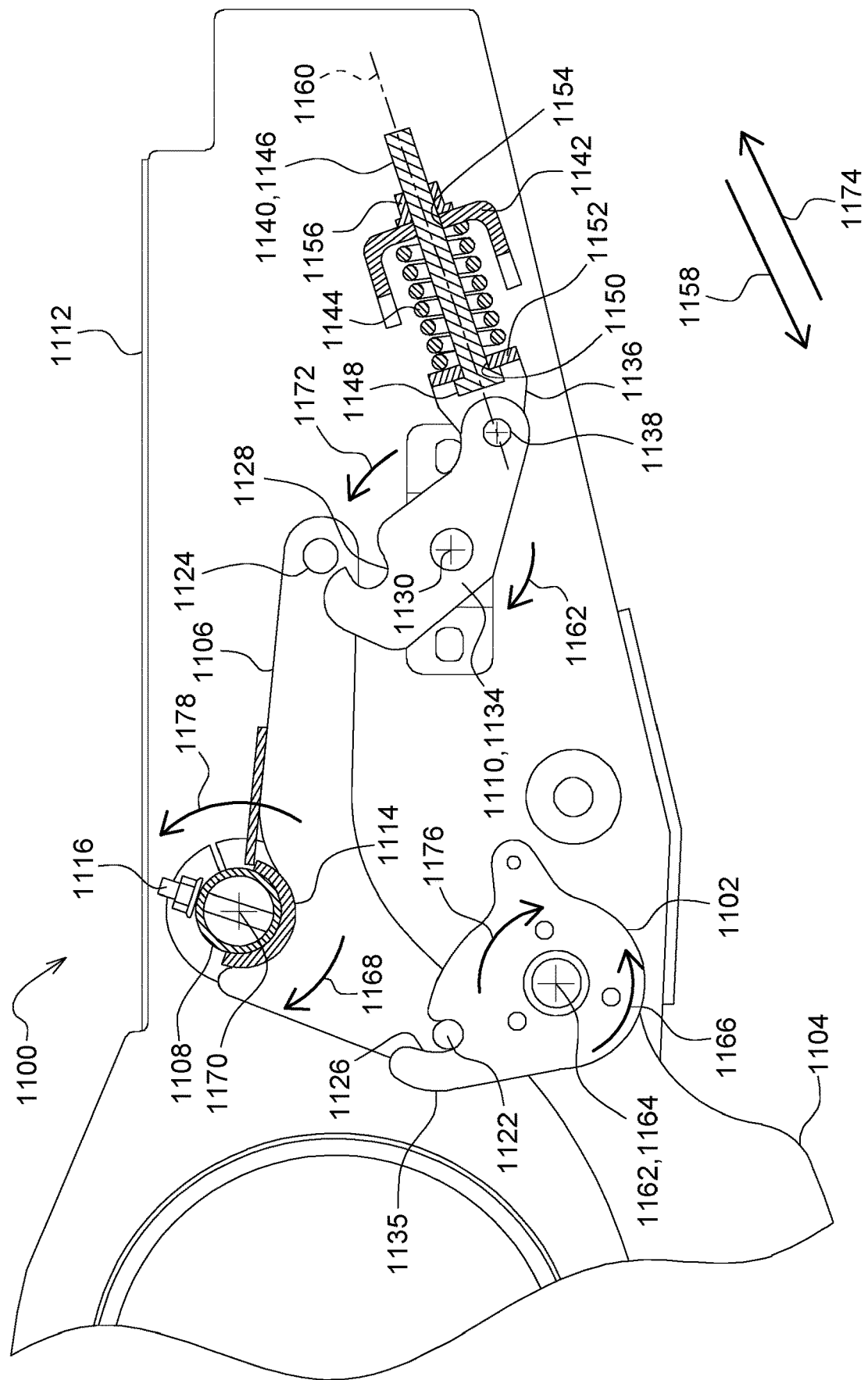
FIG. 13 is a detailed cross-sectional side view of the example actuation system of FIG. 11 in which the actuation system is in a first configuration.
Figure 14:
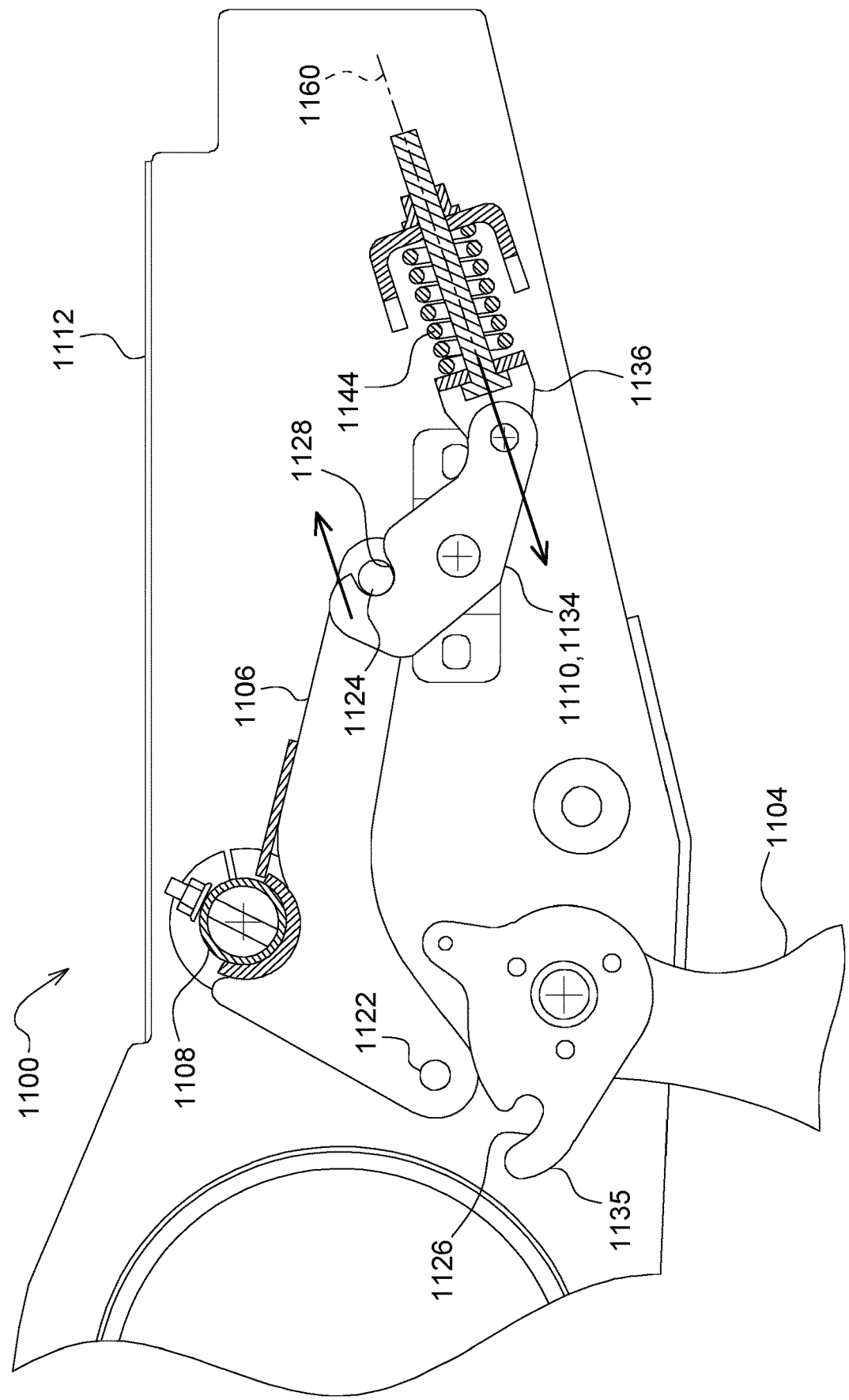
FIG. 14 is a detailed cross-sectional view of the example actuation system of FIG. 11 in which the actuation system is in a second configuration.

Operation of the actuation system 1100 is described with reference to FIGS. 13 and 14. In operation, with the gauge wheel assembly 1104 in the retracted position, extension of the gauge wheel assembly 1104 is selected, such as by an operator of an agricultural implement that includes the gauge wheel assembly 1104. In response, the gauge wheel assembly 1104 is rotated about a pivot axis 1162 of pivot 1164 in the direction of arrow 1166. As the lever 1102 is rotated with the gauge wheel assembly 1104, the interaction between the recess 1126 and the first pin 1122 causes the rocker arm 1106 to rotate in the direction of arrow 1168 about a centerline 1170 of the lockout tube 1108. Being coupled with the rocker arm 1106, the lockout tube 1108 similarly rotates about the centerline 1170 in the direction of arrow 1168, moving the float arms and cutterbar from the flexible configuration to the rigid configuration.

As the gauge wheel assembly 1104 continues to move into the extended position, the lever 1102 continues to rotate the rocker arm 1106 in the direction of arrow 1168, causing the second pin 1124 to engage the retainer 1110 and be received within the second recess 1128. In some instances, prior to the second pin 1124 being inserted into the second recess 1128, the second pin 1124 contacts an outer edge of the retainer 1110, causing the retainer 1110 to rotate a few degrees in the direction of arrow 1172. Thereafter, the second pin 1124 enters the second recess 1124, and the retainer 1110 rotates a few degrees back in the direction of arrow 1162 in response to a spring force generated by the spring 1144.

With the second pin 1124 received within the second recess 1128, the second pin 1124 causes the retainer 1110 to rotate in the direction of arrow 1172 about pivot 1130. With the second pin full received into the second recess 1128 and the retainer 1110 fully rotated in response, continued rotation of the gauge wheel assembly 1104 cause the first pin 1122 to be withdrawn from the recess 1126. As a result, rotation of the rocker arm 1106 ceases. At this point, the lockout tube 1108 is fully actuated to cause the float arms and cutterbar to be locked into the rigid configuration.

Further, as a result of rotation of the retainer 1110 in the direction of arrow 1172, the retainer 1110 displaces the bracket 1136 in the direction of arrow 1174, parallel to the centerline 1160 of the rod 1140, compressing the spring 1144. Compression of the spring 1144 (along with any preload applied to the spring 1144) produces a biasing force in the direction of arrow 1158. A shape of the recess 1128 interacts with the pin 1124 to prevent withdrawal of the pin 1124 from the recess 1128, and the produced biasing force generated by the spring 1144, in combination with the interaction between the pin 1124 and the recess 1128, lock the rocker arm 1106 and the retainer assembly 1134 together. FIG. 14 shows a condition of the actuation system 1100 when the gauge wheel assembly 1104 is in the extended position.

To retract the gauge wheel assembly 1104, an input is provided, such as by the operator of the implement, to retract the gauge wheel assembly 1104. In response, the gauge wheel assembly 1104 is rotated in the direction of arrow 1176. As the gauge wheel assembly 1104 rotates in the direction of arrow 1176, the lever 1102 engages the first pin 1122, causing the first pin 1122 to be received into the first recess 1126. Particularly, a finger 1135 extending along a side of the first recess 1126 engages the first pin 1122 and directs the first pin 1122 into the first recess 1126 as the lever 1102 is rotated in the direction of arrow 1176. With further rotation of the gauge wheel assembly 1104 in the direction of arrow 1176, engagement between the first pin 1122 and the lever 1102 causes rocker arm 1106 and the lockout tube 1108 to rotate in the direction of arrow 1178, which, in turn, causes the second pin 1124 to be removed from the second recess 1128. At this point, the lockout system unlocks, placing the cutterbar and float arms in the flexible configuration. In some instances, removal of the second pin 1124 from the second recess 1128 cause the retainer 1110 to be rotated a few degrees in the direction of arrow 1172. This rotation of the retainer 1110 causes an increased compression of the spring 1144. The biasing force generated by the second spring 1144 produces a moment that rotates the retainer 1110 back to an initial position. FIG. 13 illustrates the gauge wheel assembly 1104 in the fully retracted position.

In this way, the actuation system 1100 is operable to move the cutterbar and float arms into and between the rigid configuration and the flexible configuration in response to movement of the gauge wheel assembly 1104. Although a single gauge wheel assembly 1104 is illustrated, an implement within the scope of the present disclosure may include more than one gauge wheel assemblies that operate in a similar manner.

Similar to the spring 908, the spring 1144 can be configured to operate in a stretched or compressed condition by, for example, altering a position of the pivot 1130 relative to recess 1128 and longitudinal axis 1160.

Figure 15:
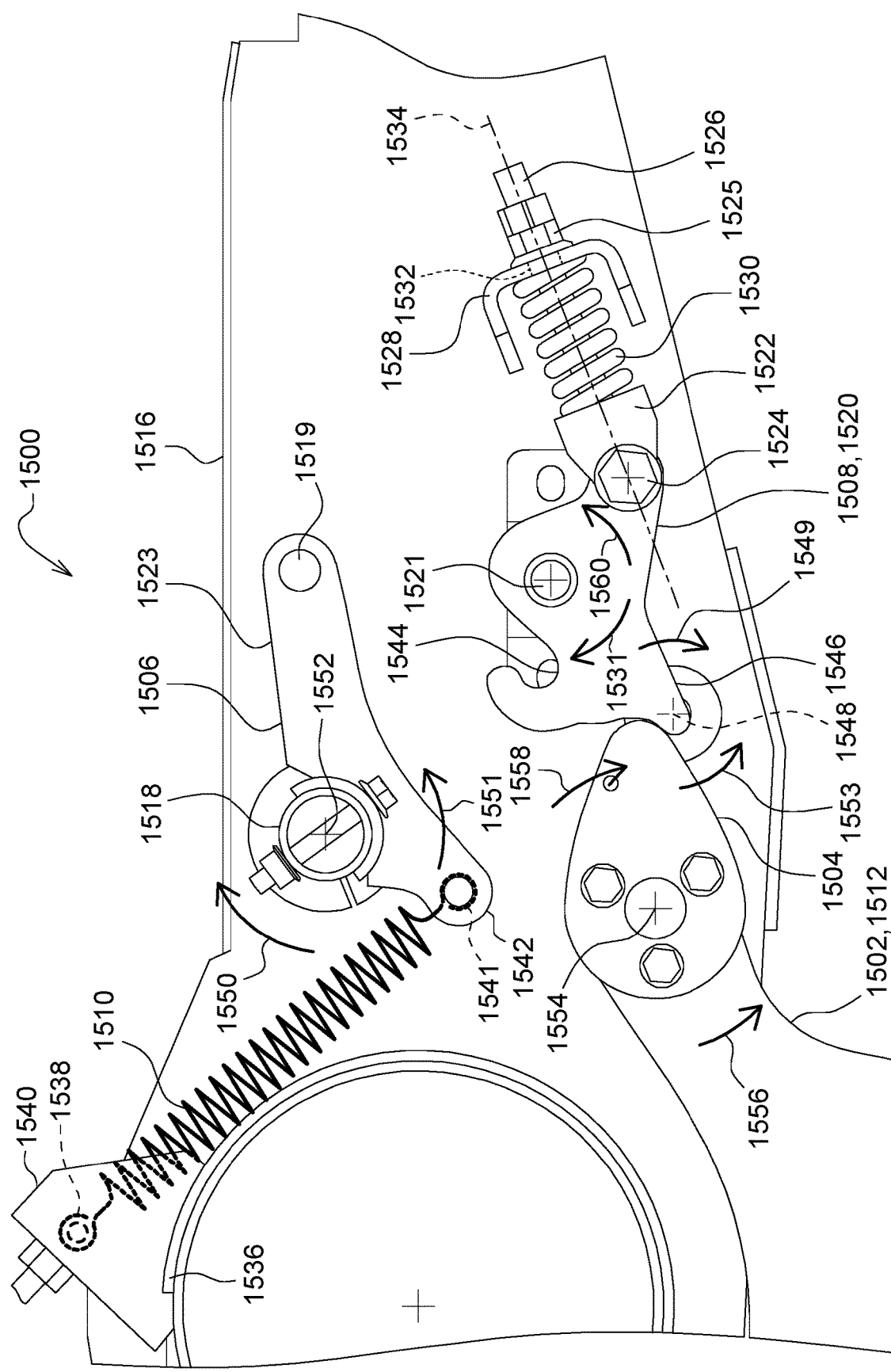
FIG. 15 is a detailed cross-sectional view of a portion of an example agricultural implement, according to some implementations of the present disclosure.
Figure 16:
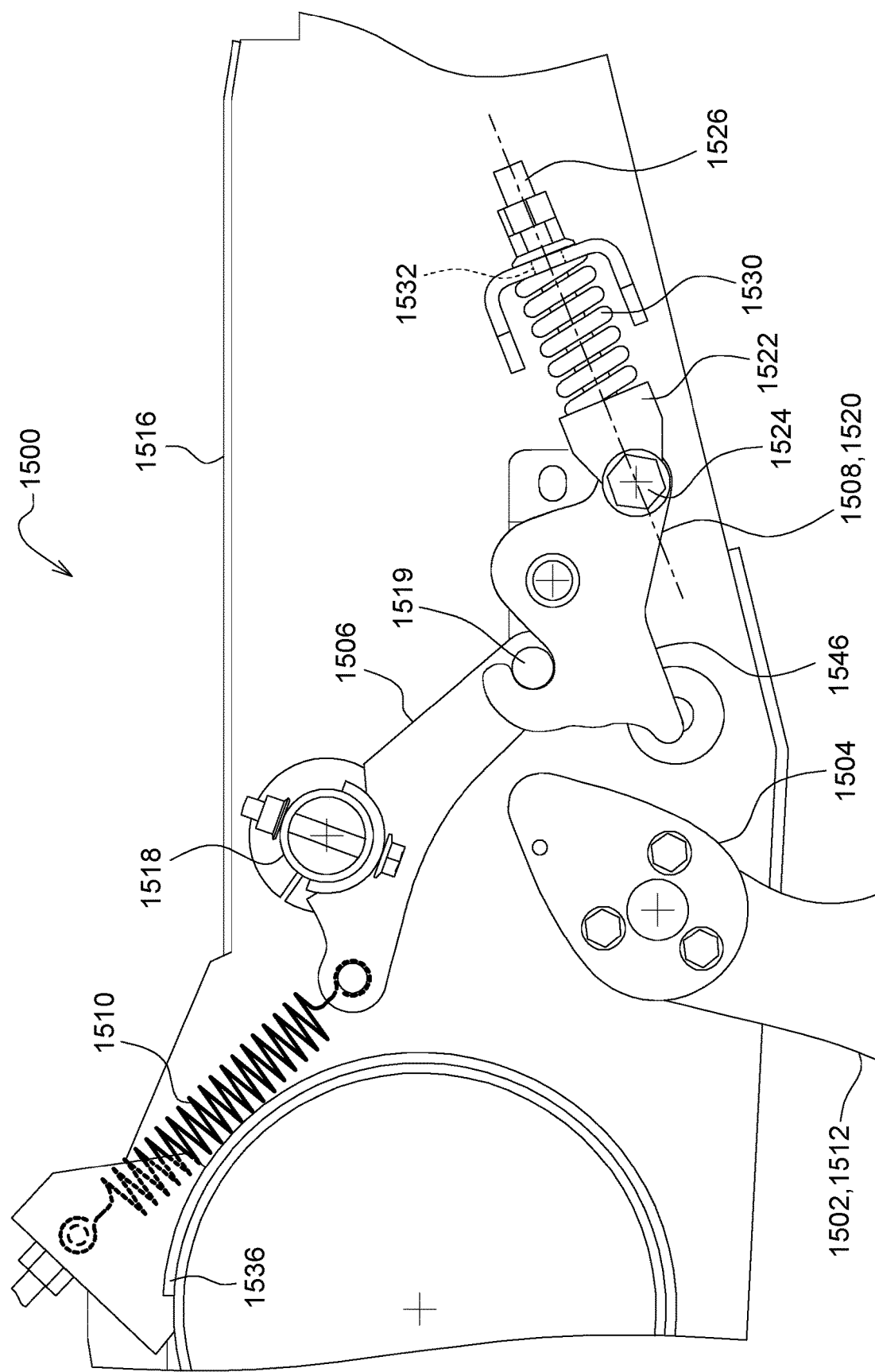
FIG. 16 is another detailed cross-sectional view of the portion of the agricultural implement of FIG. 15.

FIGS. 15 and 16 illustrate another example actuation system 1500 that is operable to move a cutterbar, which may be similar to the cutterbar 132 (shown in FIG. 1), and associated float arms, which may be similar to float arms 214 (shown in FIG. 2), between a locked, rigid configuration and an unlocked, flexible configuration in response to extension and retraction of a gauge wheel assembly 1502, which may be similar to gauge wheel assembly 1104. Although a single gauge wheel assembly 1502 is illustrated, in other implementations, additional gauge wheel assemblies 1502 may be included.

Referring to FIG. 15, the actuation system 1500 includes a cam 1504, a rocker arm 1506, a retainer assembly 1508, and a spring 1510. In some implementations, the cam 1504 is in the form of a plate that is coupled to an arm 1512 of the gauge wheel assembly 1502. The gauge wheel assembly 1502 includes the arm 1512 and a wheel pivotably coupled to the arm 1512. The wheel may be similar to the wheel 310, shown in FIG. 3, discussed earlier. The gauge wheel assembly 1502 is pivotably coupled to a mounting bracket 1516, which may be similar to mounting bracket 1112, described earlier. The rocker arm 1506 is fixedly attached to a lockout tube 1518, which may be similar to lockout tube 1108, described earlier. In some implementations, the rocker arm 1506 has a construction similar to that of the rocker arm 1106. That is, in some instances, the rocker arm 1506 includes first and second sides, which may be similar to the first and second sides 1118 and 1120 of rocker arm 1106, and pin 1519 extends between the first and second sides. Thus, when the pin 1519 is received in recess 1544, as described below, the retainer 1520 is received between the sides of the rocker arm 1506.

The rocker arm 1506 rotates with the lockout tube 1518 relative to the mounting bracket 1516. Further, the rocker arm 1506 may be attached to the lockout tube 1518 in a variety of ways, such as those described above with respect to lockout tube 1108 and rocker arm 1106. The rocker arm 1506 includes the pin 1519 disposed on a first end 1523 of the rocker arm 1506.

The retainer assembly 1508 has a construction that is similar to that of the retainer assembly 1134. The retainer assembly 1508 includes a retainer 1520 that is pivotable coupled to the mounting bracket 1516 via a pivot 1521, a bracket 1522 pivotably coupled to the retainer 1520 at a pivot 1524, a rod 1526 extending between the bracket 1522 and a bracket 1528 attached to the mounting bracket 1516, and a spring 1530 captured on the rod 1526 between the bracket 1522 and the bracket 1528. The rod 1526 extends through and is movable in an opening 1532 formed in the bracket 1528, such as in the manner described above in the context of rod 1140. Thus, the rod 1526 is movable in a direction parallel to a longitudinal axis 1534 of the rod 1526 relative to the bracket 1528, and an amount by which the spring 1520 is able to expand is limited by a fastener 1525 or another component coupled to the rod 1526, thereby limiting an amount by which the rod is movable in the opening 1532. Thus, in some implementations, the rod 1526 is retained to the bracket 1528 in a manner similar to that described above with respect to rod 1140 and bracket 1142. In the illustrated example, the spring 1510 is connected to a beam 1536 (which may be similar to beam 304) at a first end 1538 via a bracket 1540 and, at a second end 1541, to a second end 1542 of the rocker arm 1506. In other implementations, the spring 1510 may be coupled to another part of the header, such as another part of the header frame, e.g., the mounting bracket 1516. The retainer 1520 includes the recess 1544 that removably receives the pin 1519 of the rocker arm 1506.

The cam 1504 includes a cam shape that engages with a counterpart protrusion 1546 formed on the retainer 1520. As the cam 1504 rotates with the gauge wheel assembly 1502, the cam shape of the cam 1504 and the protrusion 1546 of the retainer 1520 operate to rotate the retainer about pivot 1521.

FIG. 15 shows the gauge wheel assembly 1502 in the retracted position in which the float arms and cutterbar are in the flexible configuration, and FIG. 16 shows the gauge wheel assembly 1502 in the extended position with the actuation system 1500 configured such that the lockout tube 1518 has locked the float arms and cutterbar in the rigid configuration. In normal operation, when the gauge wheel assembly 1502 is in the retracted position, the float arms of the agricultural implement are in contact with the ground. In the retracted position, the cam 1504 is in contact with the protrusion 1546 of the retainer 1520, maintaining the retainer 1520 in an unlocked configuration. In the unlocked configuration, the float arms and cutterbar, via the float arms, are in the flexible configuration and are free to pivot about axis 1548. As shown in FIG. 5, this pivot axis is defined by one or more pins, such as pin 451 in FIG. 5.

Generally, the lockout tube 1518 is connected to a plurality of float arms. When the cutterbar and float arms are in the flexible configuration and the associated implement is moved through a field, such as during a harvesting operation, the float arms are allowed to follow a contour of the ground, thus, causing the float arms to pivot about axis 1548. If at least one of the float arms pivots downwards, i.e., in the direction of arrow 1549, the float arm causes the lockout tube 1518 and rocker arm 1506 to rotate in the direction of arrow 1551 as a result of a lockout system similar to lockout system 326 coupling the float arm to the lockout tube 1518. This position of the lockout tube 1518 and rocker arm 1506 is shown in FIG. 15, and this position is the prevailing one during an agricultural operation, such as harvesting. This is because, generally, at least one float arm is at least partially in a downwardly pivoted position, causing the lockout tube 1518 to rotate in the direction of arrow 1551. In some implementations, the spring 1510 provides enough force to rotate the lockout tube 1518 and associated rocker arms 1506 about axis 1552 in the direction of arrow 1550 (such as to a position similar to that shown in FIG. 16) when all of the weight of the float arms is removed from the lockout tube 1518. Consequently, when moving the float arms and cutterbar from the flexible configuration to the rigid configuration, all of the float arms are fully pivoted in the direction of arrow 1553, such as until each of the float arms contacts a stop, thereby removing all of the weight of the float arms and cutterbar from the lockout tube 1518. In response, a forced exerted by the spring 1510 to the lockout tube 1518 (via the rocker arms 1506) causes the lockout tube 1518 and associated rocker arms 1506 to rotate in the direction of arrow 1550 and attain a position similar to that shown in FIG. 16. At this location, the float arms and cutterbar can be locked into the rigid configuration, as described in more detail below.

With the weight of the float arms and cutterbar being supported by the ground and as a result of the rotation to the lockout tube 1518 and the rocker arm 1506 due to the spring 1510, the lockout tube 1518 is maintained in a position similar to that of the lockout tube 314 shown in FIG. 7. That is, the lockout tube 1518 is maintained in a position that is or is close to a locked position, as shown, for example, in FIG. 7 (referred to as the first position in the description associated with FIG. 7). This rotation of the lockout tube 1518 and rocker arm 1506 cause the pin 1519 to be received into the recess 1544 formed in the retainer 1520.

When the gauge wheel assembly 1502 is moved from the retracted position to the extended position, such as by an actuator, the gauge wheel assembly 1502 rotates about pivot 1554 in a direction of arrow 1556. As the rotation of the gauge wheel assembly 1520 occurs, the cam 1504 disengages from the protrusion 1546 of the retainer 1520, which, in return, causes the compressed spring 1530 to expand and exert a moment on the retainer 1520. The retainer 1520 rotates about pivot 1521 in the direction of arrow 1531 in response to the moment, locking the rocker arm 1506 and the lockout tube 1518 into position. Further, locking of the lockout tube 1518 and the rocker arm 1506 into position by the retainer 1520 occurs before all of the weight of the float arms and cutterbar is removed from the ground. Consequently, the float arms and cutterbar are locked into position during an initial range of rotation during extension of the gauge wheel assembly 1502. As rotation of the gauge wheel assembly 1502 continues to the point where all of the weight of the float arms and cutterbar is removed from the ground and is, therefore, no longer supported by the ground, the float arms and cutterbar are locked into the rigid configuration. FIG. 16 shows the actuation system 1500 in a configuration in which the float arms and cutterbar are locked in the rigid configuration.

Thus, the actuation system 1500 is operable to lock the float arms and cutterbar of an implement into a rigid configuration within a portion of the actuation of a gauge wheel assembly during movement from a retracted position to an extended position. In some implementations, locking the float arms and cutterbar into the rigid configuration occurs within 15 percent of the range of movement between the retracted position and the extended position. In other implementations, locking occurs at other percentages of movement. For example, locking may occur at five percent, ten percent, 20 percent, 25 percent, or 30 percent. In still other implementations, locking may occur at percentages of the movement of the gauge wheel assembly that is less than five percent, greater than 30 percent, or at some point between the specific percentages described.

The gauge wheel assembly 1502 is retracted into the retracted position to move the cutterbar and float arms from the rigid configuration into the flexible configuration. Referring again to FIGS. 15 and 16, with the gauge wheel assembly 1502 in the extended position (shown in FIG. 16), the gauge wheel assembly 1502 is retracted, such as in response to an operator input. During retraction, the gauge wheel assembly 1502 is rotated about the pivot 1554 in the direction of arrow 1558. During rotation of the gauge wheel assembly 1502, the cam 1504 engages the protrusion 1546 of the retainer 1520, causing the retainer 1520 to rotate in the direction of arrow 1560. This releases the pin 1519 from the recess 1544, thereby unlocking the lockout tube 1518 and rocker arm 1506 and placing the float arms and cutterbar into the flexible configuration. The gauge wheel assembly 1502 continues to rotate about the pivot 1554 in the direction of arrow 1558 until the gauge wheel assembly 1502 reaches the retracted position, as shown in FIG. 15.

Locking the cutterbar into the rigid configuration during a selected amount of rotation of the gauge wheel assembly as the gauge wheel assembly is moved from the retracted position to the extended position is important because, in some instances, the gauge wheels may not be fully deployed to the extended position. This may be due, for example, to user preference or ground topography. In any case, since the gauge wheels can be extended to any number of positions between the retracted position and the extended position, it is desirous to have the cutterbar locked into the rigid configuration for any of those gauge wheel assembly deployed positions. Therefore, the actuation system 1500 is operable to place the float arms and cutterbar into a rigid configuration after a small amount of extension of the gauge wheel assembly 1502 and, in some case, almost immediate locking once the gauge wheel assembly 1502 has started to deploy away from the retracted position. Consequently, the actuation system 1500 provides for providing the float arms and cutterbar in the rigid configuration for a range of deployments of the gauge wheel assembly 1502 that is less than the extended position, which, in such cases may be referred to as a fully extended position.

Without in any way limiting the scope, interpretation, or application of the claims appearing below, a technical effect of one or more of the example implementations disclosed herein is to automatically move a cutterbar of an agricultural implement between a rigid configuration and a flexible configuration in response to extension or retraction of a gauge wheel (e.g., a gauge wheel assembly). Another technical effect of one or more of the example implementations disclosed herein is to provide for locking a cutterbar into a rigid configuration within a portion of a total amount of articulation of a gauge wheel during deployment of the gauge wheel into an extended position. This provides for placing the cutterbar into a rigid configuration for different amounts of deployment of the gauge wheel or gauge wheels.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A system for automatically configuring a cutterbar of an agricultural implement comprising:
   a frame;
   a cutterbar;
   a float arm engaged with the cutterbar, the float arm movably mounted with respect to the frame;
   an actuation system that connects the float arm and a gauge wheel, the float arm movable with respect to the frame, via the actuation system, in response to retraction or extension of the gauge wheel to move the cutterbar between a rigid configuration and a flexible configuration; and
   a gauge wheel assembly, wherein the gauge wheel assembly includes an arm moveable between a retracted position and an extended position, and the gauge wheel rotatably coupled to the arm;
   wherein the actuation system includes:
      a lever coupled to the arm of the gauge wheel assembly and rotatable in response to movement of the arm;
      a pivotably mounted rocker arm comprising a first pin; and
      a pivotably mounted retainer comprising a first recess that removably receives the first pin.

2. The system of claim 1, wherein the gauge wheel arm is pivotable about a pivot,
   wherein rotation of the gauge wheel arm about the pivot in a first direction pivots the float arm in a second direction to place the cutterbar into the rigid configuration, and
   wherein rotation of the gauge wheel arm about the pivot in a third direction, opposite the first direction, pivots the float arm in a fourth direction, opposite the second direction, to place the cutterbar into the flexible configuration.

3. The system of claim 1, wherein rotation of the rocker arm in a first direction about a first axis causes the first pin to engage the first recess and move the retainer into a locked configuration to secure the first pin within the first recess, and
   wherein rotation of the rocker arm in a second direction causes the retainer to move into an unlocked configuration and removal of the first pin from the first recess.

4. The system of claim 2, wherein the retainer is biased towards the locked configuration.

5. The system of claim 1, wherein the lever comprises a second recess and wherein the rocker arm further comprises a second pin.

6. The system of claim 5, wherein extension of the arm from the retracted position to the extended position rotates the lever to displace the rocker arm about a first axis to move the float arm into a first position in which the cutterbar is placed into the rigid configuration.

7. The system of claim 6, wherein rotation of the lever in response to extension of the arm causes the first pin to be received into the first recess and the second pin to be removed from the second recess.

8. The system of claim 7, wherein receipt of the first pin into the first recess engages the retainer that moves the retainer into a locked configuration to secure the first pin in the first recess.

9. The system of claim 5, wherein retraction of the arm from the extended position to the retracted position rotates the lever to capture the second pin into the second recess, causing the rocker arm to rotate about a first axis to move the float arm into a second position in which the cutterbar is placed into the flexible configuration and remove the first pin from the first recess.

10. The system of claim 9, wherein the lever comprises a finger extending along a side of the second recess, wherein the finger engages the second pin to direct the second pin into the second recess during rotation of the lever as the arm is retracted from the extended position to the retracted position.

11. The system of claim 1, wherein the receipt of the first pin in the first recess or removal of the first pin from the first recess pivots the retainer to compress a spring.

12. The system of claim 1, wherein extension of the gauge wheel comprises rotation of the gauge wheel in a first direction and wherein retraction of the gauge wheel comprises rotation of the gauge wheel in a second direction.

13. An agricultural implement comprising:
   a frame;
   a gauge wheel assembly coupled to the frame and moveable between an extended position and a retracted position, the gauge wheel assembly including a gauge wheel and a gauge wheel arm;
   a float arm pivotably coupled to the frame;
   a cutterbar engaged with the float arm, the cutterbar moveable between a rigid configuration and a flexible configuration in response to rotation of the float arm; and
   an actuation system connecting the float arm and the gauge wheel assembly, the float arm rotatable, via the actuation system, in response to movement of the gauge wheel assembly, the float arm pivotable in a first direction in response to extension of the gauge wheel assembly to place the cutterbar in the rigid configuration and the float arm pivotable in a second direction in response to retraction of the gauge wheel assembly to place the cutterbar in the flexible configuration, wherein the actuation system further includes:
      a shaft rotatable about a longitudinal axis;
      a first linkage including at least two interconnected links connecting the gauge wheel arm to the shaft so that the shaft is rotated by rotational movement of the gauge wheel arm; and
      a second linkage including at least two interconnected links connecting the shaft to the float arm so that the float arm is rotated by rotational movement of the shaft.

14. An agricultural implement comprising:
a frame;
a gauge wheel assembly coupled to the frame and moveable between an extended position and a retracted position;
a float arm pivotably coupled to the frame;
a cutterbar engaged with the float arm, the cutterbar moveable between a rigid configuration and a flexible configuration in response to rotation of the float arm; and
an actuation system connecting the float arm and the gauge wheel assembly, the float arm rotatable, via the actuation system, in response to movement of the gauge wheel assembly, the float arm pivotable in a first direction in response to extension of the gauge wheel assembly to place the cutterbar in the rigid configuration and the float arm pivotable in a second direction in response to retraction of the gauge wheel assembly to place the cutterbar in the flexible configuration;
wherein the gauge wheel assembly comprises:
an arm pivotably coupled to the frame; and
a gauge wheel rotatably mounted to the arm, and wherein the actuation system comprises:
a lever coupled to the arm of the gauge wheel assembly and rotatable therewith;
a pivotably mounted rocker arm comprising a first pin, the rocker arm coupled to the float arm; and
a pivotably mounted retainer comprising a first recess that removably receives the first pin.

15. The agricultural implement of claim 14, wherein rotation of the rocker arm in a first direction about an axis causes the first pin to engage the first recess and move the retainer into a locked configuration to secure the pin within the first recess, and wherein rotation of the rocker arm in a second direction causes the retainer to move into an unlocked configuration and removal of the first pin from the first recess.

16. The agricultural implement of claim 14, wherein extension of the arm from the retracted position to the extended position rotates the lever to displace the rocker arm about an axis to move the float arm into a first position in which the cutterbar is placed into the rigid configuration.

17. The agricultural implement of claim 14, wherein the lever comprises a second recess, wherein the rocker arm comprises a second pin, and wherein rotation of the lever in response to extension of the arm causes the first pin to be received into the first recess and the second pin to be removed from the second recess.

18. The agricultural implement of claim 14, wherein the lever comprises a second recess, wherein the rocker arm comprises a second pin, and wherein retraction of the arm from the extended position to the retracted position rotates the lever to capture the second pin into the second recess, causing the rocker arm to rotate about an axis to move the float arm into a second position in which the cutterbar is placed into the flexible configuration and to remove the first pin from the first recess.

19. The agricultural implement of claim 13, wherein:
the at least two interconnected links of the second linkage include a first link fixed to the shaft for rotation with the shaft, and an arcuate shaped second link pivotally connected to the first link, the arcuate shaped second link defining a recess configured to receive the shaft when the cutterbar is moved to the rigid configuration.

20. The agricultural implement of claim 19, wherein:
the at least two interconnected links of the second linkage further include a tensioner pivotally connected to the arcuate shaped second link and connected to the float arm.

* * * * *